US007974739B2

(12) United States Patent
Nelson et al.

(10) Patent No.: US 7,974,739 B2
(45) Date of Patent: Jul. 5, 2011

(54) SYSTEM AND METHOD HAVING ARM WITH CABLE PASSAGE THROUGH JOINT TO INFRARED LAMP

(75) Inventors: James S. Nelson, Mounds View, MN (US); Mark A. Rekucki, Blaine, MN (US)

(73) Assignee: Illinois Tool Works Inc., Glenview, IL (US)

( * ) Notice: Subject to any disclaimer, the term of this patent is extended or adjusted under 35 U.S.C. 154(b) by 1104 days.

(21) Appl. No.: 11/544,111

(22) Filed: Oct. 6, 2006

(65) Prior Publication Data

US 2007/0299558 A1 Dec. 27, 2007

Related U.S. Application Data

(60) Provisional application No. 60/816,770, filed on Jun. 27, 2006.

(51) Int. Cl.
*G05B 15/00* (2006.01)

(52) U.S. Cl. ........................................................ 700/258

(58) Field of Classification Search .................. 700/245, 700/258, 259; 901/1, 8, 9, 10, 14–19, 27–30, 901/36, 38

See application file for complete search history.

(56) References Cited

U.S. PATENT DOCUMENTS 4,771,728 A 9/1988 Bergman, Jr.
4,907,533 A 3/1990 Nelson et al.
4,908,231 A 3/1990 Nelson et al.
4,943,447 A 7/1990 Nelson et al.
5,050,232 A 9/1991 Bergman et al.
5,306,359 A 4/1994 Eppeland et al.
5,318,280 A 6/1994 Bannick
5,335,308 A 8/1994 Sorensen
5,375,480 A * 12/1994 Nihei et al. ................ 74/490.02
5,453,931 A * 9/1995 Watts, Jr. ........................ 701/23
5,485,985 A 1/1996 Eppeland et al.
5,551,670 A 9/1996 Heath et al.

(Continued)

FOREIGN PATENT DOCUMENTS

DE 10051169 4/2002

(Continued)

OTHER PUBLICATIONS

U.S. Appl. No. 11/144,978, filed Jun. 3, 2005, Nelson et al.

*Primary Examiner* — Kim T Nguyen
(74) *Attorney, Agent, or Firm* — Fletcher Yoder

(57) ABSTRACT

In one embodiment, a system is provided with a rotatable arm having a movable joint, an infrared lamp coupled to the rotatable arm, and an electrical cable extending through the rotatable arm and the movable joint. In another embodiment, a system is provided with a base and an arm coupled to the base via a first rotatable joint, wherein the arm has an arcuate shape. The system also may include a head coupled to the arm via a second rotatable joint, an infrared lamp coupled to the head, and a temperature sensor disposed adjacent the infrared lamp. Furthermore, the system may include an air flow passage extending through the first rotatable joint, the arm, and the second rotatable joint. A fan also may be pneumatically coupled to the air flow passage. In addition, an electrical cable may be disposed in the air flow passage, wherein the electrical cable extends to the infrared lamp and the temperature sensor.

28 Claims, 20 Drawing Sheets

U.S. PATENT DOCUMENTS

| | | | | |
|---|---|---|---|---|
| 5,605,222 | A | 2/1997 | Huberty et al. | |
| 5,650,026 | A | 7/1997 | Ganyo et al. | |
| D418,211 | S | 12/1999 | Lundin | |
| D457,228 | S | 5/2002 | Lundin | |
| 6,731,866 | B2 | 5/2004 | Ueno | |
| 2002/0066331 | A1 * | 6/2002 | Okada et al. | 74/490.03 |
| 2004/0037064 | A1 | 2/2004 | Johnson | |
| 2004/0057708 | A1 | 3/2004 | Nelson | |
| 2004/0136700 | A1 * | 7/2004 | Yackel | 392/411 |

FOREIGN PATENT DOCUMENTS

| | | |
|---|---|---|
| WO | WO2006047866 | 5/2006 |

* cited by examiner

SYSTEM AND METHOD HAVING ARM WITH CABLE PASSAGE THROUGH JOINT TO INFRARED LAMP

CROSS REFERENCE TO RELATED APPLICATION

This application claims priority to U.S. Provisional Patent Application No. 60/816,770, filed on Jun. 27, 2006, which is hereby incorporated by reference.

BACKGROUND

The present technique relates generally to finishing systems and, more particularly, to industrial finish curing systems.

Finish coatings, such as paint, are often applied to a product and subsequently cured via heating devices. In many finishing systems, the product is placed in a curing room, where heat is flowed through the room to dry the finish coatings that were applied to the product. Unfortunately, these curing rooms are costly in terms of space consumption within the facility, and the curing rooms are incapable of focusing heat on specific regions of the product.

In certain applications, a heater is coupled to a mechanical arm, which is manually moved to a desired position relative to the target product. In this manner, heat can be focused on specific regions of the product. For example, a user may grasp a portion of the arm, and then push or pull the arm to orient the heater over a surface of the target product. Unfortunately, the size, shape, weight, position, or complexity of the target object, the arm, or the heater often complicates the user's ability to orient the heater in the desired position relative to a surface material to be cured. In addition, the electrical wires may block, restrict, jam, or generally complicate movement of the arm.

BRIEF DESCRIPTION

In one embodiment, a system is provided with a rotatable arm having a movable joint, an infrared lamp coupled to the rotatable arm, and an electrical cable extending through the rotatable arm and the movable joint. In another embodiment, a system is provided with a base and an arm coupled to the base via a first rotatable joint, wherein the arm has an arcuate shape. The system also may include a head coupled to the arm via a second rotatable joint, an infrared lamp coupled to the head, and a temperature sensor disposed adjacent the infrared lamp. Furthermore, the system may include an air flow passage extending through the first rotatable joint, the arm, and the second rotatable joint. A fan also may be pneumatically coupled to the air flow passage. In addition, an electrical cable may be disposed in the air flow passage, wherein the electrical cable extends to the infrared lamp and the temperature sensor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of an adjustable arm are used to position a curing device, such as an infrared heating lamp, in a desired orientation to heat, dry, or generally cure a surface material (e.g., paint, primer, clear coat, decals, stain, and other finish coatings) on a variety of target objects (e.g., vehicles, furniture, fixtures, and other products). In certain embodiments, the adjustable arm has one or more internal cable passageways to route electrical and/or control cables to the curing device. In addition, the adjustable arm may include one or more joints, such as adjustable friction joints, which include one or more internal cable passageways. Thus, the electrical and/or control wires may be at least substantially or entirely concealed within the adjustable arm and joints. In this manner, the wires are generally protected from potential damage or disconnection during use of the adjustable arm, while the adjustable arm is able to move without potential interference by the wires. The internal cable passageways also may enable fluid flow (e.g., air, water, or another coolant) along adjustable arm to/from the infrared heating lamp. In some embodiments, the adjustable arm also includes a rotatable arm having an arcuate shape, which provides greater clearance between the rotatable arm and a target object (e.g., an automobile having paint being cured by the curing device).

Figure 1:
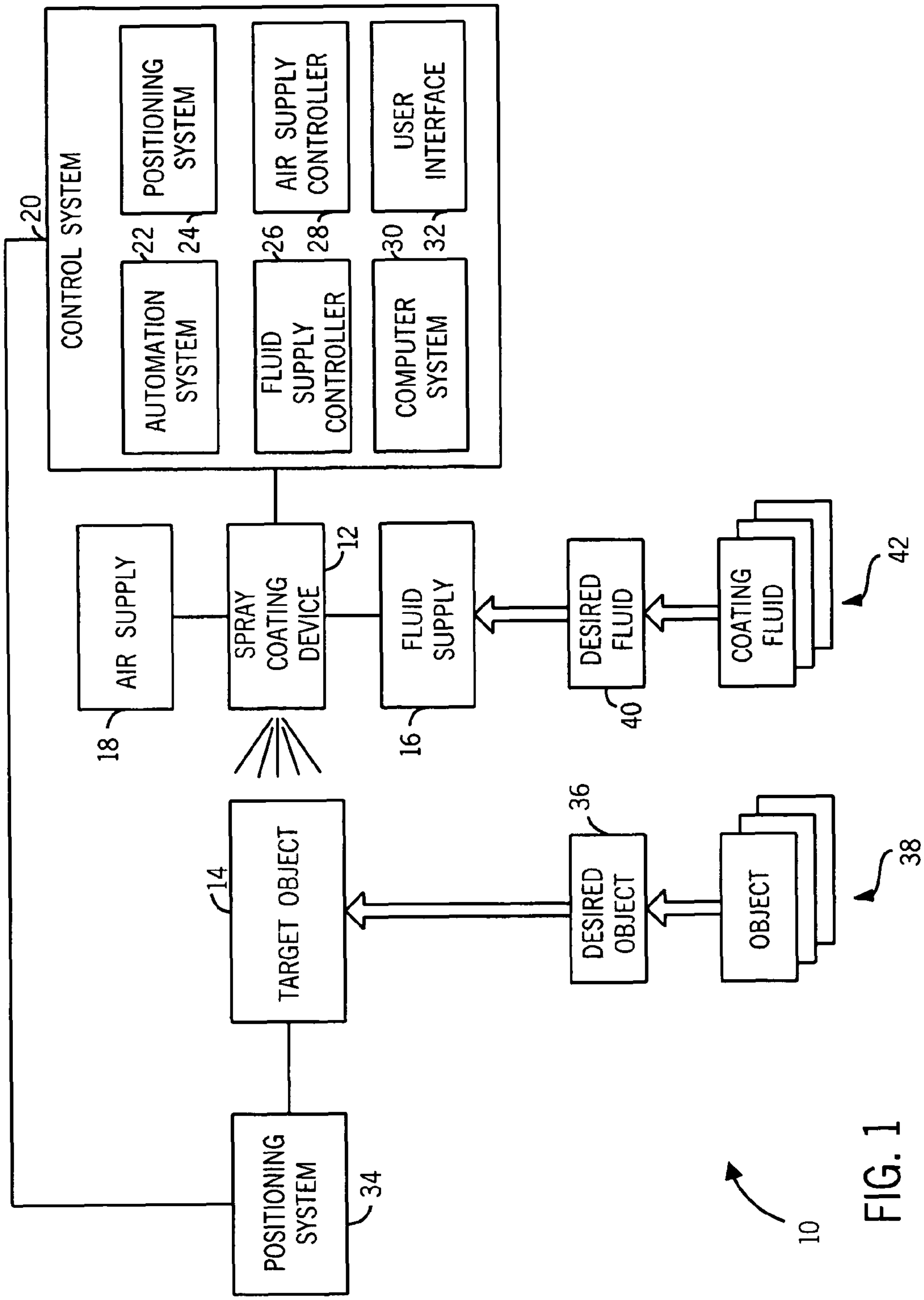
FIG. 1 is a diagram illustrating an embodiment of a finishing system.

FIG. 1 is a flow chart illustrating an exemplary finishing system 10, which comprises a spray coating device 12 for applying a desired coating to a target object 14. For example, the spray coating device 12 may comprise an air atomizer, a rotary atomizer, an electrostatic atomizer, or any other suitable spray formation mechanism. The spray coating device 12 may be coupled to a variety of supply and control systems, such as a material supply 16 (e.g., a fluid or powder), an air supply 18, and a control system 20. The control system 20 facilitates control of the material and air supplies 16 and 18 and ensures that the spray coating device 12 provides an acceptable quality spray coating on the target object 14. For example, the control system 20 may include an automation system 22, a positioning system 24, a material supply controller 26, an air supply controller 28, a computer system 30, and a user interface 32. The control system 20 also may be coupled to a positioning system 34, which facilitates movement of the target object 14 relative to the spray coating device 12. For example, the positioning system 34 may comprise an assembly line, a hydraulic lift, a robotic arm, and a variety of other positioning mechanisms controlled by the control system 20. Accordingly, the finishing system 10 may provide a computer-controlled spray pattern across the surface of the target object 14.

The finishing system 10 of FIG. 1 is applicable to a wide variety of applications, fluid coating materials, powder coating materials, target objects, and types/configurations of the spray coating device 12. For example, a user may select a desired object 36 from a variety of different objects 38, such as different material and product types. The user also may select a desired material 40 from a plurality of different materials 42, which may include different coating types, colors, textures, and characteristics for a variety of materials such as metal and wood. For example, the desired material 40 may comprise a powder coating material, a fluid coating material (e.g., a paint), a filler material (e.g., body filler), and so forth. In one exemplary embodiment, the finishing system 10 may be incorporated into a vehicle assembly line or a vehicle repair facility.

Figure 2:
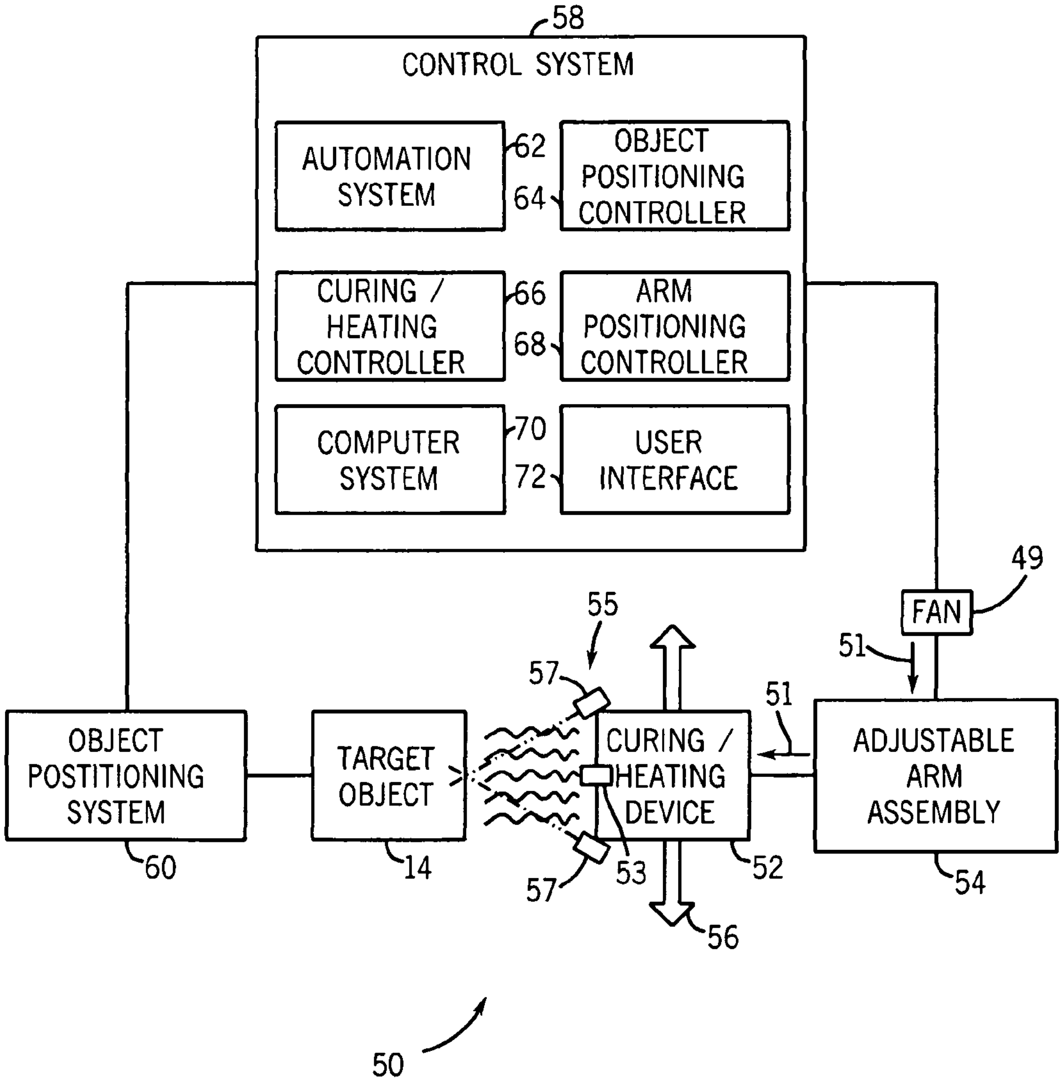
FIG. 2 is a diagram illustrating an embodiment of a finish curing system.

FIG. 2 is a block diagram illustrating an exemplary finish curing system 50, which comprises a curing/heating device 52 for curing a desired material applied to the target object 14. For example, the curing/heating device 52 may comprise one or more heating devices, drying devices, or other suitable curing mechanisms. In certain embodiments discussed below, the curing/heating device 52 includes one or more radiative curing devices, such as infrared lamps, which radiate energy (e.g., electromagnetic energy) to cure coatings or applications of paint, filler materials, decals, stain, or other surface materials on the target object 14.

In this exemplary embodiment, the curing/heating device 52 is coupled to an adjustable arm assembly 54, which positions the curing/heating device 52 in a desired curing position relative to the target object 14. For example, in one embodiment, the adjustable arm assembly 54 includes a hydraulic or pneumatic piston and cylinder assembly coupled to a rotatable arm. In another embodiment, the adjustable arm assembly 54 comprises a drive (e.g., a worn gearing mechanism) coupled to a rotatable arm, an electric motor coupled to the drive, and a control unit (e.g., an electronic user control) coupled to the electric motor.

However, in each of these embodiments, the adjustable arm assembly 54 includes an internal passage configured to pass one or more electrical/communication cables between the control system 58 and the curing/heating device 52. For example, the internal passage may extend through various joints, connectors, and movable portions of the adjustable arm assembly 54, such that the electrical/communication cables are at least substantially or entirely concealed within the assembly 54. The joints having cable passages may include one or more rotational joints, horizontal sliding joints, vertical sliding joints, telescoping joints, swivel joints, pivot joints, and so forth. The internal passage also may route a coolant fluid flow (e.g., cooling airflow, liquid flow, etc.) along the length of the electrical/communication cables. For example, the finish curing system 50 may include one or more cooling fans 49 pneumatically coupled to the internal passage. In other words, the cooling fans 49 are configured to blow air through the adjustable arm assembly 54 as indicated by arrows 51. The cooling airflow also may be directed toward sensors and other components disposed on the curing/heating device 52. In certain embodiments, the internal passage may include a plurality of coolant passages, including a coolant supply passage and a coolant return passage. In other words, a coolant supply passage may supply a fluid coolant (e.g., air, water, or another gas or liquid) along the adjustable arm assembly 54 to the curing/heating device 52, and then subsequently return the fluid coolant in a reverse direction after dissipating heat from the curing/heating device 52. Thus, the system 50 may further include a pump, radiator, and other components remote from the curing/heating device 52 (e.g., on a base of the arm assembly 54).

The outer end or peripheral portion of the adjustable arm assembly 54 also has an adjustable height mechanism 56, which adapts the vertical range of the adjustable arm assembly 54 to the geometry of the particular target object 14. For example, the adjustable height mechanism 56 is movable along a linear path between high and low positions to accommodate target objects (e.g., cars, trucks, boats, airplanes, or other vehicles) ranging from large-sized to small-sized. In some embodiments, linear path includes discrete mounting points for the curing/heating device 52, while other embodiments include a continuous path of mounting points. Moreover, embodiments of the adjustable height mechanism 56 may be characterized as providing only vertical motion without any arcuate path. However, the other joints may be disposed between the adjustable arm assembly 54 and the curing/heating device 52 to provide different degrees of freedom, e.g., different axes of rotation.

In addition, the finish curing system 50 may include a temperature sensor 53 and a laser sighting system 55. For example, the temperature sensor 53 may include an optical pyrometer configured to sense the surface temperature of the target object 14, and provide temperature feedback to enable closed loop control. Alternatively, the temperature sensor 53 may include a radiation pyrometer. The radiation pyrometer may include a lens configured to focus radiation onto a thermal sensing element (e.g., a thermopile, a vacuum thermocouple, or a bolometer), which is coupled to an amplifier and in turn a recorder.

The laser sighting system 55 may include one or more lasers 57 configured to enable proper positioning of the curing/heating device 52 and the temperature sensor 53 relative to the target object 14. For example, the laser sighting system 57 may output crossing laser beams in the direction of the target object 14. These laser beams are configured to intersect at the desired distance away from the curing/heating device 52 and the temperature sensor 53. Thus, if the curing/heating device 52 is too close or too far away from the target object 14, then the laser beams create a pair of separated laser dots on the surface of the target object 14. These separated laser dots generally merge as the curing/heating device 52 is moved closer to the desired distance between the curing/heating device 52 and the target object 14. Upon reaching the desired position/distance, the two laser beams create a generally unified or single laser dot on the surface of the target object 14.

The finish curing system 50 also may include a variety of positioning and control systems (e.g., manual and/or automatic), such as control system 58 and object positioning system 60. The control system 58 ensures that the desired material is efficiently and optimally cured onto the target object 14. For example, the control system 58 may include an automation system 62, an object positioning controller 64 coupled to the object positioning system 60, a curing/heating controller 66 coupled to the curing/heating device 52, an arm positioning controller 68 coupled to the adjustable arm assembly 54, a computer system 70, and a user interface 72.

As illustrated in FIG. 2, the control system 58 may control aspects of the adjustable arm assembly 54 and the curing/heating device 52. For example, embodiments of the control system 58 include a variety of hardware and software to execute various curing cycles, movements of the target object 14, and movements of the adjustable arm assembly 54 in desired patterns, times, and orientations between the curing/heating device 52 and the surface of the target object 14. More specifically, certain embodiments of the curing/heating controller 66 include one or more processors, memory, user interfaces or controls (e.g., display, mouse, keyboard, remote control unit, directional control buttons or switches, etc.), computers, networks, wireless communication devices, and code configured to effectuate a desired curing cycle. The curing cycle, for example, may include a temperature profile that varies over time based on a particular surface material and, also, the desired characteristics or results that are to be achieved by curing the particular surface material. The curing cycle also may include a positional pattern for moving the curing/heating devices 52 relative to the surface of the target object 14.

In certain embodiments, the control system 58 includes a closed loop controller responsive to various feedback and inputs to control operation of the curing/heating device 52. For example, the feedback may include temperature feedback from the temperature sensor 53, which may be indicative of actual surface temperature of the target object 14. The inputs may include adjustable operating parameters of a particular curing process. For example, the inputs may include a set point temperature, a power limit, a time, a proportional band, a manual reset, a manual idle, a manual cure, and other operational inputs. The set point temperature input may indicate the desired or target temperature of the surface during a curing process. The power limit input may indicate the maximum power of the curing/heating device 52. The time input may indicate the desired amount of time at the set point temperature. The proportional band input may indicate an area of temperature control. For example, if the curing/heating device 52 has a temperature range of 0-400 degrees Celsius, then the proportional band may be 10 percent of the full temperature range. During operation, if the actual sensed surface temperature falls above or below this proportional band (e.g., 10 percent of full range), then the control system 58 may appropriately decrease or increase the power of the curing/heating device 52 to cause the actual surface temperature to return to the proportional band. The manual reset may be used to shift the proportional band to bring the actual sensed surface temperature and the set point temperature closer together, for example, after stabilization of the curing process. The manual idle may be selected to eliminate the automatic control of the curing/heating device 52. For example, the manual idle may have a maximum setting of 30, 40, 50, or 60 percent of the maximum power to the curing/heating device 52. The manual idle also may terminate via a stop button rather than an automatic shutdown. The manual cure may be similar to the manual idle, except the manual cure may not have any preset limits on the power to the curing/heating device 52. The control system 58 also may include a variety of monitored parameters, such as the actual sensed surface temperature, wattage of the curing/heating device 52, percent power of the curing/heating device 52, elapsed time, and so forth. In this manner, the control system 58 may provide closed loop control of the curing process, thereby improving the characteristics of the cured coating on the surface of the target object 14.

In addition, the object positioning system 60 facilitates movement of the target object 14 relative to the curing/heating device 52. For example, the object positioning system 60 may comprise a manual positioning mechanism, an assembly line, a hydraulic lift, a robotic arm, and a variety of other positioning mechanisms operated by the control system 58. Using these control features, the finish curing system 50 can automatically cure/dry the desired material to provide a cured surface material with the desired characteristics. For example, the present technique may produce a uniquely cured powder coating, fluid spray coating, filler material, adhesively-backed decal, or any other such material applied to the surface.

Figure 3:
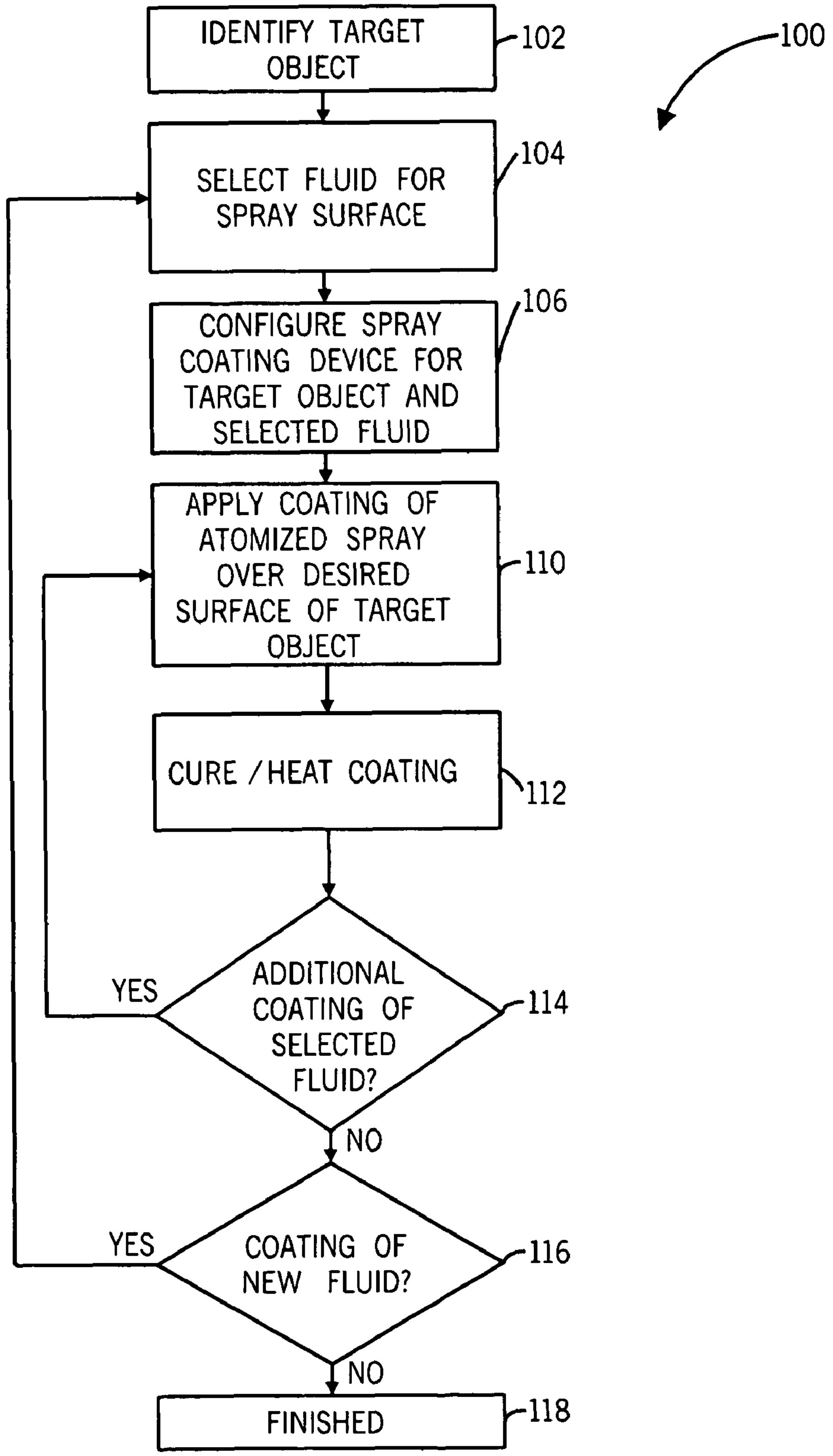
FIG. 3 is a flow chart illustrating an embodiment of a finishing and curing process of the systems as illustrated in FIGS. 1 and 2.

FIG. 3 is a flow chart of an exemplary finishing process 100 for applying and curing a desired material to the target object 14. As discussed above, the desired material may be a powder coating material, a fluid coating material, a filler material, or any other suitable surface applied material, including paints, varnishes, clear coats fillers, top coats, and so forth. As illustrated, the process 100 proceeds by identifying the target object 14 for application of the desired material (block 102). The process 100 then proceeds by selecting the desired material 40 for application to a surface of the target object 14 (block 104). A user may then proceed to configure the application device, the identified target object 14, and desired material (block 106). If the device is a spraying device, the process 100 then proceeds to create an atomized spray of the selected fluid or powder. The user may then apply the desired material over the desired surface of the target object 14 (block 110). The process 100 then proceeds to cure/dry the desired material that was applied over the desired surface (block 112). For example, the curing block 112 may include executing a curing cycle to emit a desired level of heat or radiation (e.g., infrared radiation) toward the desired material over a desired time period. The heat/radiation profile may be constant, stepped, or curved based on the desired curing time and material characteristics to be achieved by the curing cycle. The curing cycle also can include a positional pattern of movement for moving the curing device relative to the surface. If the user desired an additional application of the desired material at query block 114, then the process 100 proceeds through blocks 110 and 112 to provide another application of the desired material. If the user does not desire an additional material application at query block 114, then the process 100 proceeds to query block 116 to determine whether the user desires a new material application. If a new material application is desired at query block 116, then the process 100 proceeds through blocks 104-114 with a new selected material. If the user does not desire a new material application at query block 116, then the process 100 is finished at block 118.

Figure 4:
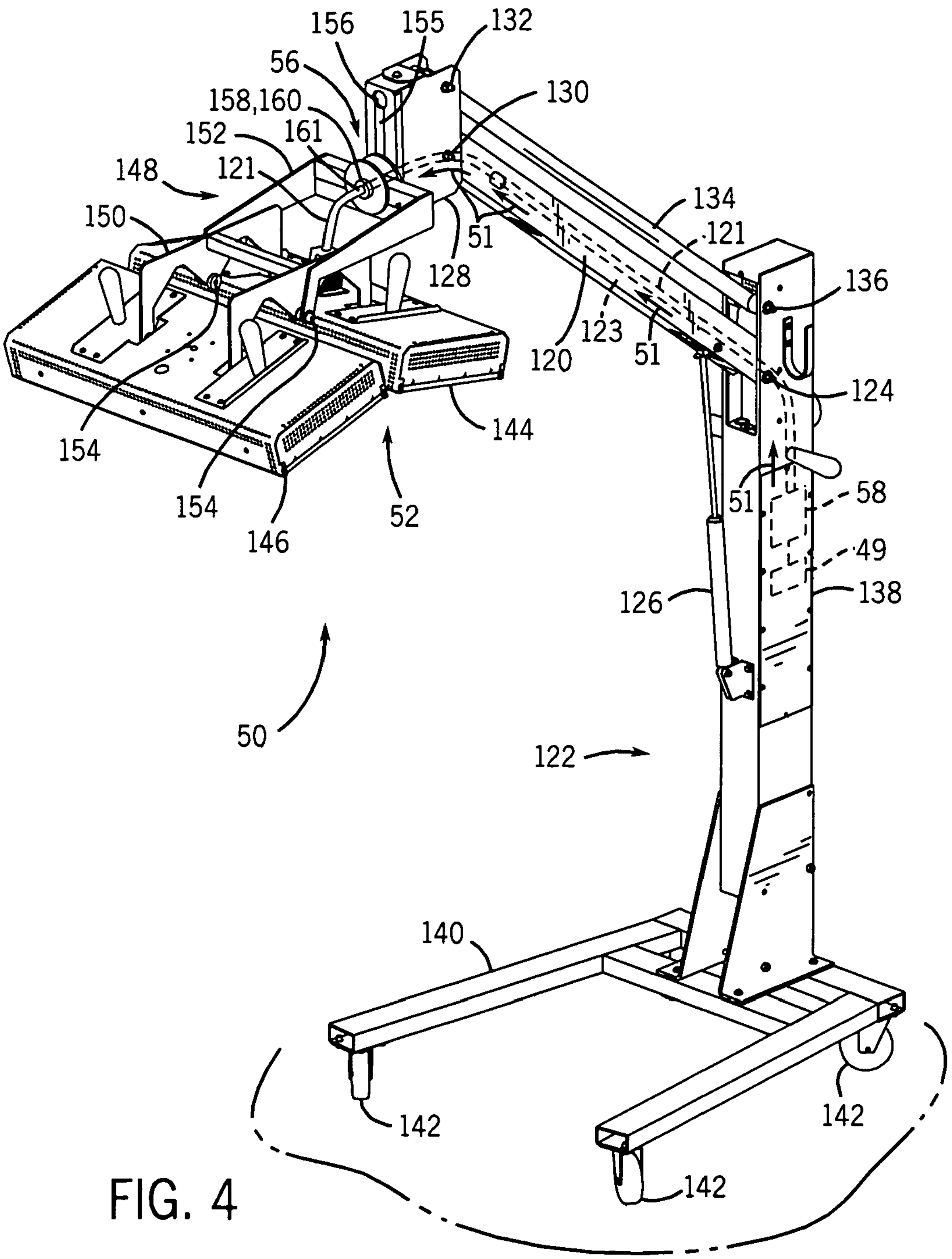
FIG. 4 is a perspective view of an embodiment of an adjustable arm assembly, curing device, and adjustable height mechanism of the finish curing system as illustrated in FIG. 2.

As described in further detail below, the foregoing systems 10 and 50 and the finishing process 100 may utilize a variety of positioning assemblies, such as the adjustable arm assembly 54. FIG. 4 is a perspective view of an exemplary embodiment of the finish curing system 50 having the curing device 52 coupled to the adjustable arm assembly 54 via the adjustable height mechanism 56. As illustrated, the adjustable arm assembly 54 comprises an arm structure 120 rotatably coupled to an arm support 122 via a pivot joint 124 (e.g., an adjustable friction pivot joint). As discussed above with reference to FIG. 2, the illustrated embodiment also includes one or more electrical/communication cables 121 disposed in one or more passages 123 extending through the adjustable arm assembly 54 between the control system 58 and the curing device 52. The control system 58 is mounted within, on, and/or outside the arm support 122. The illustrated embodiment also includes one or more of the fans 49 pneumatically coupled to the internal passage 123, thereby facilitating cooling airflow 51 along the electrical/communication cables 121 toward the curing device 52. Again, the one or more passages 123 and electrical/communication cables 121 extend through various movable joints of the adjustable arm assembly 54, such that the electrical/communication cables 121 are at least substantially or entirely concealed within the assembly 54 between the control system 58 and the curing device 52. The control system 58 may then receive power from a single power cable leading to an external power source.

Although the arm structure 120 is illustrated as a single straight arm, the adjustable arm assembly 54 may have a multi-section arm and any suitable straight or curved geometry. The arm structure 120 also may have a variety of positioning control linkages to facilitate a desired vertical, lateral, and angular position. For example, the illustrated adjustable arm assembly 54 has an arm positioning linkage 126 extending between the arm support 122 and the arm structure 120, such that the arm structure 120 may be moved vertically in a range extending between minimum and maximum vertical positions. The adjustable arm assembly 54 also may have a variety of rotation-inducing mechanisms coupled to the arm structure 120, such that the arm structure 120 can be positioned in a desired angular position. In the illustrated embodiment, the adjustable arm assembly 54 has an adjustable end structure 128 rotatably coupled to the arm structure 120 at a pivot joint 130 (e.g., an adjustable friction pivot joint). At an adjacent pivot joint 132, the adjustable end structure 128 is rotatably coupled to an end positioning linkage 134 that is rotatably coupled to the arm support 122 via a pivot joint 136. As described with reference to FIG. 2, each of, the foregoing linkages may comprises a variety of manual or automatic motion-inducing mechanisms, such as a hydraulic mechanism, a pneumatic mechanism, a geared mechanism, a motorized mechanism, a cable and pulley mechanism, or any other suitable mechanism.

The illustrated arm support 122 includes a vertical support 138 extending from a base structure 140, which has a plurality of wheels 142. However, the arm support 122 may comprise any suitable fixed or movable structure depending on the particular application. For example, the arm support 122 may be bolted or generally secured to a wall, a floor, a vehicle, a trailer, or any other suitable vertical, horizontal, or angled mounting structure. The arm support 122 also may have a manual or automatic positioning system, such as a rotational or linear positioning system to move the arm support 122 adjacent the target object 14. For example, the arm support 122 may be coupled to a rail structure along a floor, wall, or ceiling. In addition, the rail structure may include a powered drive mechanism to push or pull the arm support 122. By further example, the arm structure may be expandable and contractible in a vertical direction, such that the height of the arm support 122 can be varied to accommodate a particular curing application. Again, a powered drive mechanism can be included to facilitate this vertical expansion and contraction of the arm support 122. Accordingly, the adjustable arm assembly 54 can position the curing device 52 in a desired curing position relative to the target object 14.

The curing device 52, as illustrated in FIG. 4, includes a pair of heating/drying devices 144 and 146. The heating/drying devices 144 and 146 can have any suitable drying mechanism, such as conductive, convective, and/or radiative heat transfer mechanisms, which may cure a fluid coating, a powder coating, a filler, an adhesive, and so forth. For example, the heating/drying device 144 and 146 may comprise a fuel combustion heater, an electrical resistance heater, or a radiation heating mechanism. In the illustrated embodiment, the heating/drying devices 144 and 146 include a pair of infrared lamps. The heating/drying devices 144 and 146 are mounted to a head structure 148, which is coupled to the adjustable end structure 128 via the adjustable height mechanism 56. The illustrated head structure 148 has a fork-shaped extension 150 rotatably coupled to an E-shaped support 152 via a pivot joint 154. However, any suitable multi-section or integral support structure or yoke is within the scope of the present technique. The head structure 148 also may have a manual or automatic positioning system to pivot the E-shaped support 152 about the pivot joint 154.

Figure 6:
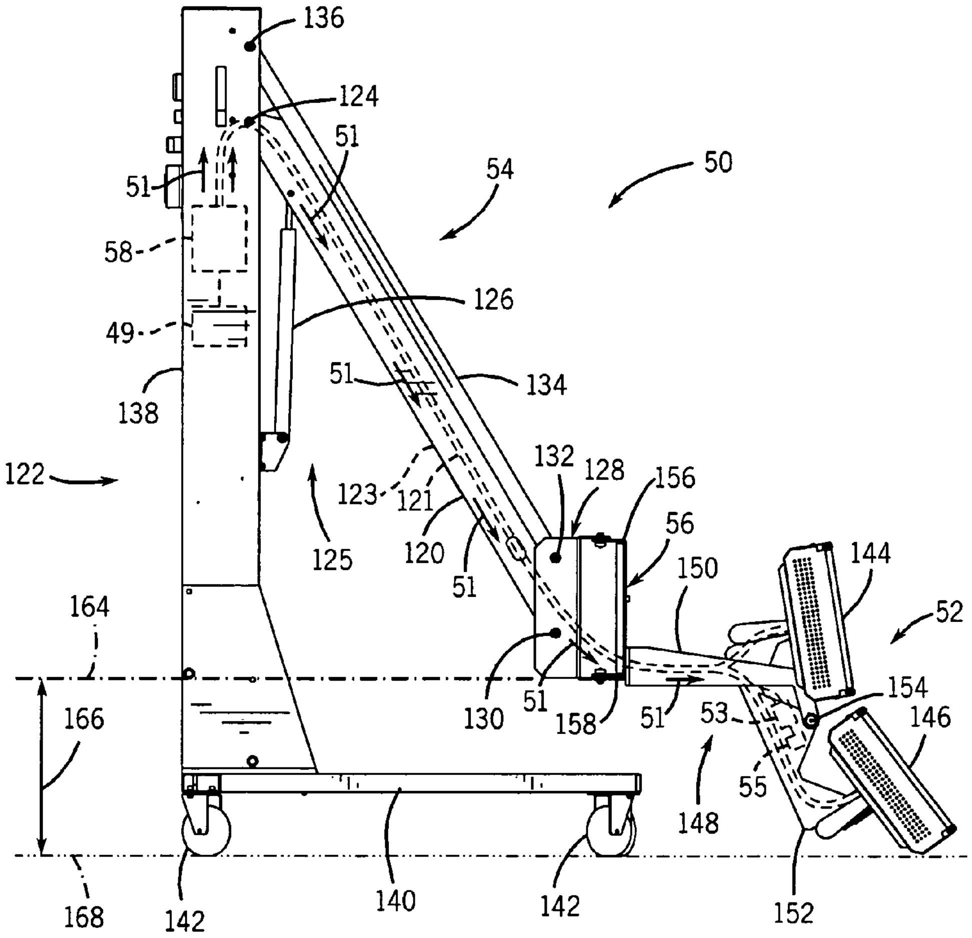
FIGS. 6-9 are side views illustrating different height configurations of the finish curing system as illustrated in FIGS. 4 and 5.

At the adjustable end structure 128, the adjustable height mechanism 56 of FIG. 4 includes a vertical path or slot 155 having a high mounting position 156 and a low mounting position 158 for the head structure 148. Specifically, the vertical path or slot 155 is configured to enable passage of the electrical/communication cables 121 and the cooling airflow 51 from the one or more fans 49, while also ensuring that the high and low mounting positions 156 and 158 remain independent and discrete. In this exemplary embodiment, the head structure 148 is interchangeably and selectively mountable at either one of the high and low mounting positions 156 and 158 via a fastener 160 (e.g., hollow fastener). For example, the high and low mounting positions 156 and 158 may comprise female threads that can receive male threads of the fastener 160. In the illustrated embodiment, the female threads of the high and low mounting positions 156 and 158 are sized relatively larger than the slot 155. The oversized diameter of the female threads ensures that the high and low mounting positions 156 and 158 are independent from one another, while also enabling the cooling airflow 51 to pass along with the cables 121 through the female threads and a passage 161 through the fastener 160. The electrical/communication cables 121 also may be disposed within a conduit, paneling, or another enclosure between the fastener 160 and the curing device 52, thereby completely enclosing the cables 121. In addition, the airflow 51 may be directed toward various sensors (e.g., temperature sensor 53), devices (e.g., laser sighting system 55), and components on or adjacent the curing device 52, as illustrated in FIGS. 2 and 6. The high and low mounting positions 156 and 158 also may include mechanical latches, hooks, or other releasable and interchangeable mount structures. The illustrated fastener 160 also may operate as a pivot joint (e.g., an adjustable friction pivot joint) for rotating the head structure 148 relative to the arm structure 120. A manual or automatic positioning system may then be coupled to the foregoing pivot joint to facilitate rotation of the head structure 148.

Alternatively, the adjustable height mechanism 56 may have a single mounting mechanism, such as an offset mounting structure, while the adjustable height mechanism 56 is reversibly and interchangeably mountable to the adjustable end structure 128. For example, the adjustable height mechanism 56 may be released, swiveled about a pivot joint, and then resecured to the adjustable end structure 128. The adjustable height mechanism 56 also may be detached, rotated 180 degrees, and then reattached to the adjustable end structure 128. Accordingly, by reversibly mounting the adjustable height mechanism 56 to the adjustable height mechanism 56, the head structure 148 can be mounted in a higher or lower position similar to those of the high and low mounting positions 156 and 158.

In either the multi-mount or single-mount configuration of the adjustable height mechanism 56, the height variance between the various mounting mechanisms may be selected to extend the adjustable arm assembly 54 beyond its minimum and maximum height. For example, if the prospective target objects 14 have a variety of dimensions, such as large-sized and small-sized, then the foregoing height variance can be tailored to the different heights of these differently sized target objects. In an automotive application, the height variance may be chosen to accommodate vehicles ranging from small cars to large trucks. The height variance also may accommodate different object positions, such as lift-mounted, trailer mounted, assembly line mounted, pallet-mounted, and so forth.

Figure 5:
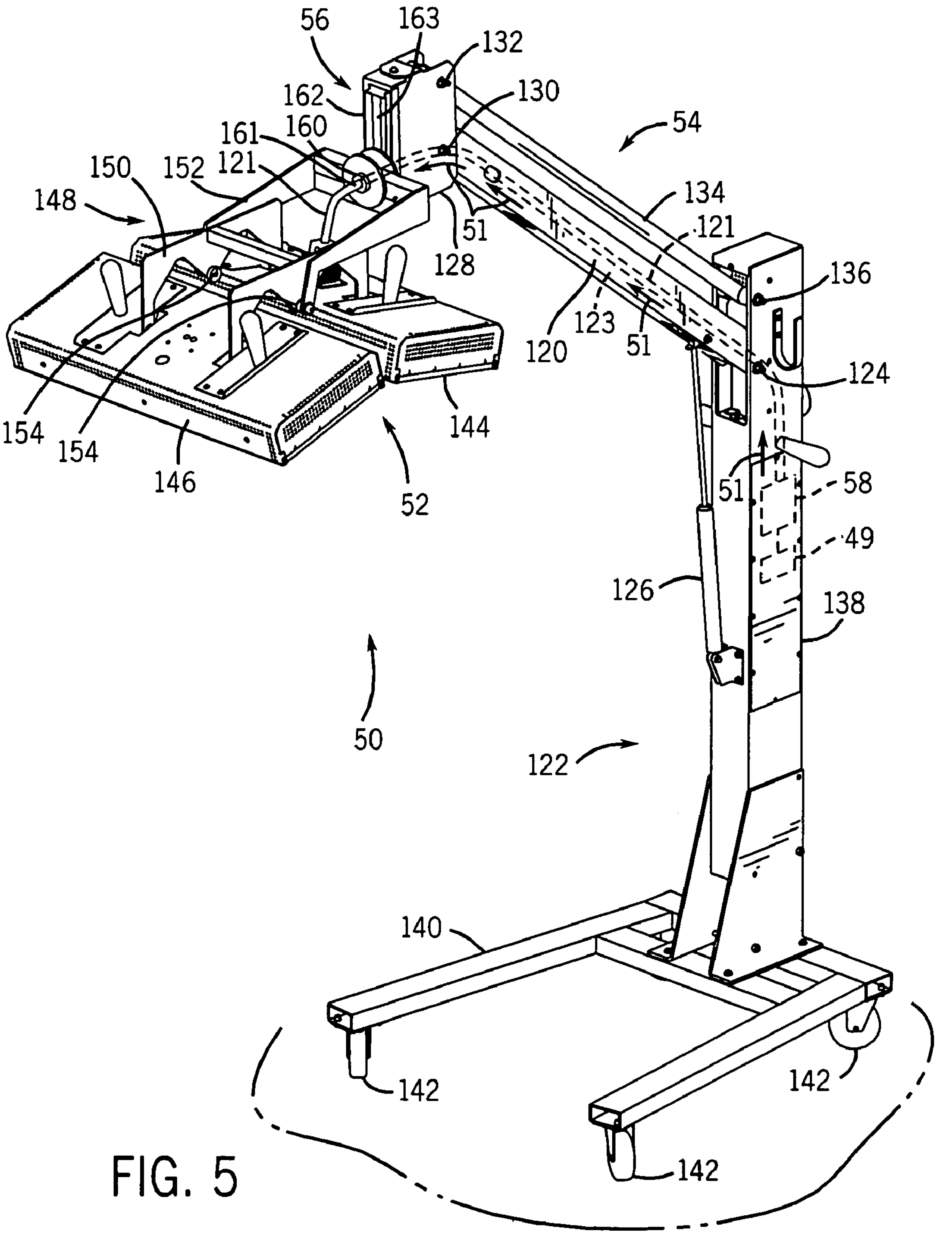
FIG. 5 is a perspective view of an alternative embodiment of the finish curing system as illustrated in FIG. 4.

In a further alternative embodiment, the adjustable height mechanism 56 may comprise a linear positioning mechanism 162, as illustrated in FIG. 5. The linear positioning mechanism 162 may have a variety of manual or automatic motion-inducing mechanisms, such as a hydraulic mechanism, a pneumatic mechanism, a geared mechanism, a motorized mechanism, a cable and pulley mechanism, a rail and carrier mechanism, or any other suitable manually or automatically movable mechanism. Again, the vertical range of the linear positioning mechanism 162 may be tailored to the different heights and sizes of the prospective target objects 14.

Again, similar to the embodiment of FIG. 4, the finish curing system 50 of FIG. 5 includes one or more electrical/communication cables 121 disposed in one or more passages 123 extending through the adjustable arm assembly 54 between the control system 58 and the curing device 52. The control system 58 is mounted within, on, and/or outside the arm support 122. The illustrated embodiment also includes one or more of the fans 49 pneumatically coupled to the internal passage 123, thereby facilitating cooling airflow 51 along the electrical/communication cables 121 toward the curing device 52. Again, the one or more passages 123 and electrical/communication cables 121 extend through various movable joints of the adjustable arm assembly 54, such that the electrical/communication cables 121 are at least substantially or entirely concealed within the assembly 54 between the control system 58 and the curing device 52. For example, the pivot joints 124 and 130 and the linear positioning mechanism 162 enable internal passage of both the electrical/communication cables 121 and the cooling airflow 51 generally without extending outside the adjustable arm assembly 54. In certain embodiments, the passages 123 include airflow passages, liquid coolant passages, or a combination thereof. For example, the passages 123 may include a fluid supply passage and a fluid return passage, which collectively define a fluid circulation path in both directions between the curing device 52 and the arm support 122. Accordingly, the system 50 also may include a pump, a radiator, and other components coupled to the fluid circulation path in the arm support 122. In addition, the fluid circulation path may extend along various portions of the head structure 148 adjacent the curing device 52. The control system 58 may then receive power from a single power cable leading to an external power source.

The linear positioning mechanism 162 of FIG. 5 includes a vertical slot 163 generally aligned with the passage 161 through the fastener 160. As a result, the cooling airflow 51 and the electrical/communication cables 121 can extend directly through the linear positioning mechanism 162 rather than looping around the joint outside of the adjustable arm assembly 54. The electrical/communication cables 121 also may be disposed within a conduit, paneling, or another enclosure between the fastener 160 and the curing device 52, thereby completely enclosing the cables 121. In addition, the airflow 51 may be directed toward various sensors (e.g., temperature sensor 53), devices (e.g., laser sighting system 55), and components on or adjacent the curing device 52, as illustrated in FIGS. 2 and 6.

In operation, the finish curing system 50 can position the head structure 148 and mounted curing device 52 adjacent low and high surfaces of various different target objects 14, such as small and large-sized vehicles. At each of these positions, the heating/drying devices 144 and 146 operate to cure the desired material applied to the surface of the target object 14. Again, the desired material may be a paint, a wax, a filler (e.g., body filler), a fluid or powder sprayed coating material, a brush applied coating material, a clear coat material, or any other suitable surface application materials. FIGS. 6-9 are side views illustrating exemplary configurations of the finish curing system 50 utilizing the adjustable height mechanism 56.

Figure 7:
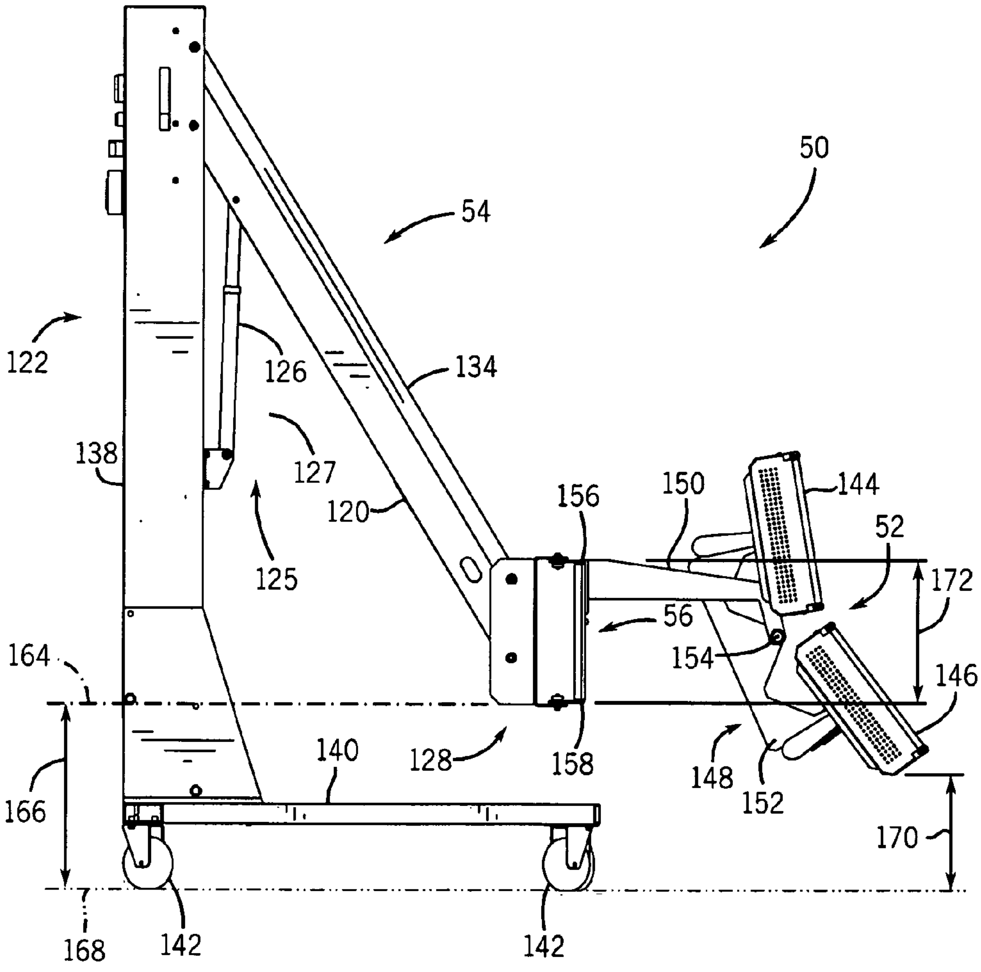

As illustrated in FIGS. 6 and 7, the system 50 can position the arm structure 120 in a minimum height position 164, which is disposed at a vertical distance 166 from a ground position 168. At this minimum height position 164, the adjustable height mechanism 56 vertically adapts the adjustable arm assembly 54 to the particular size and position of the target object 14. For example, the adjustable arm assembly 54 may move the head structure 148 and mounted curing device 52 to the low mounting position 158, as illustrated in FIG. 6. In the low mounting position 158, the curing device 52 is positionable at or below the ground level 168, such that the curing device 52 can cure the desired material at the base of the target object 14. For example, the low mounting position 158 may be particularly advantageous for small-sized vehicles, pallet-mounted vehicles, or other target objects 14 positioned near the ground level 168. As illustrated in FIG. 7, the adjustable arm assembly 54 also can move the head structure 148 and mounted curing device 52 to the high mounting position 156. In the high mounting position 156, the curing device 52 is positioned above the ground level 168 at a vertical height 170, which relates to a vertical offset 172 provided between the high and low mounting positions 156 and 158. Accordingly, the curing device 52 can cure the desired material at the base of a large-sized or high-positioned target object 14, such as a large vehicle, a lift-mounted vehicle, and so forth.

Figure 8:
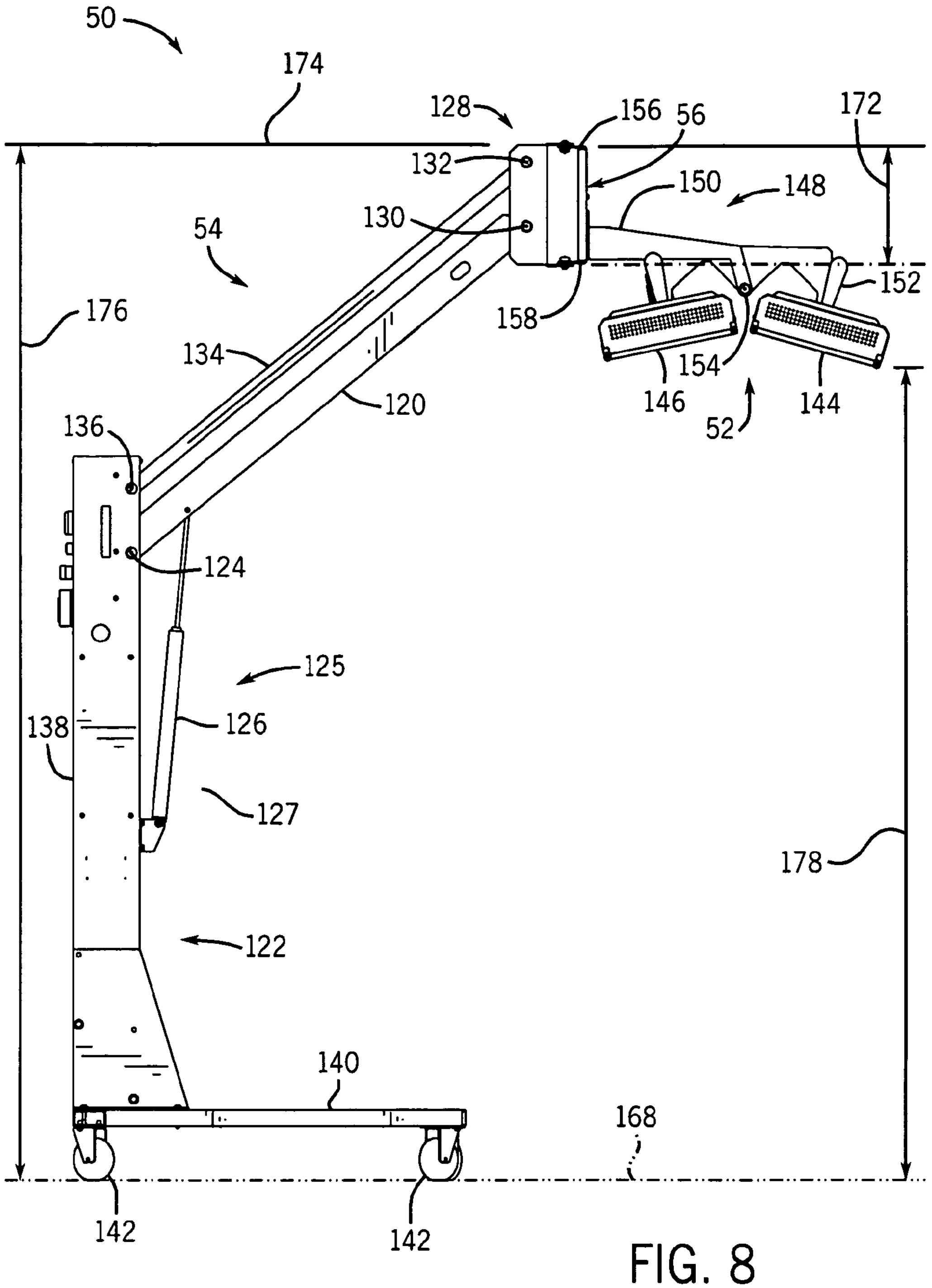
Figure 9:
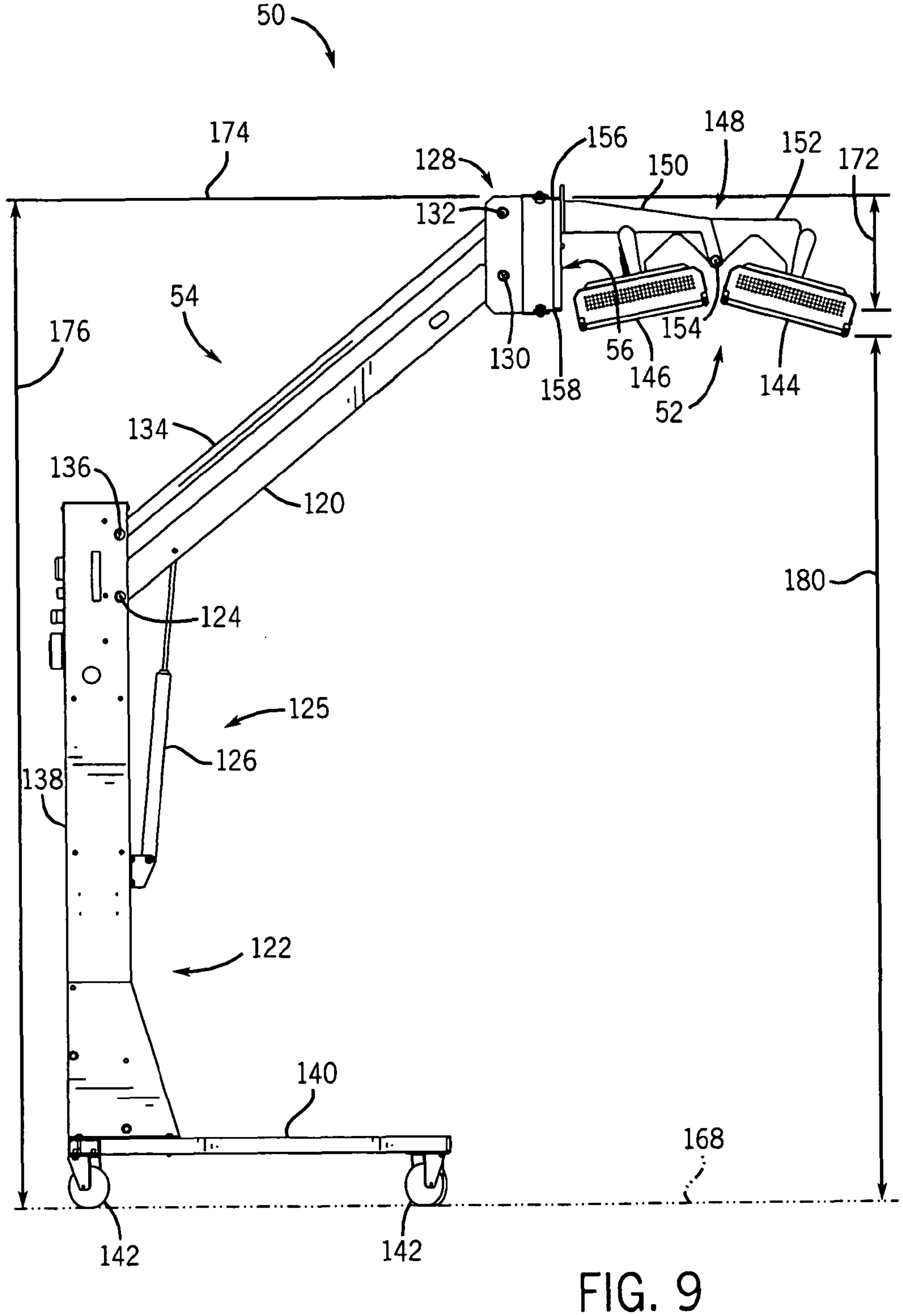

As illustrated in FIGS. 8 and 9, the system 50 also can position the arm structure 120 in a maximum height position 174, which disposes the arm structure 120 at a vertical distance 176 from the ground position 168. At this maximum height position 174, the adjustable height mechanism 56 vertically adapts the adjustable arm assembly 54 to the particular size and position of the target object 14. The finish curing system 50 also may rotate the curing device 52 to a downwardly facing orientation, which facilitates curing of a desired material disposed on an upper surface of the target object 14. If the target object 14 has a low topside, then the adjustable arm assembly 54 may move the head structure 148 and mounted curing device 52 to the low mounting position 158, as illustrated in FIG. 8. In this low mounting position 158, the heating/drying devices 144 and 146 are offset from the ground level 168 at a vertical distance 178. As described above, the low mounting position 158 may be particularly advantageous for small-sized vehicles, pallet-mounted vehicles, or other low to the ground target objects 14. The adjustable arm assembly 54 also can move the head structure 148 and mounted curing device 52 to the high mounting position 156, as illustrated in FIG. 9. In the high mounting position 156, the heating/drying devices 144 and 146 are disposed at a vertical height 180, which is higher than the vertical height 178 by the vertical offset 172. Accordingly, the curing device 52 can cure the desired material at the topside of a large-sized or high-positioned target object 14, such as a large vehicle, a lift-mounted vehicle, and so forth.

Figure 10:
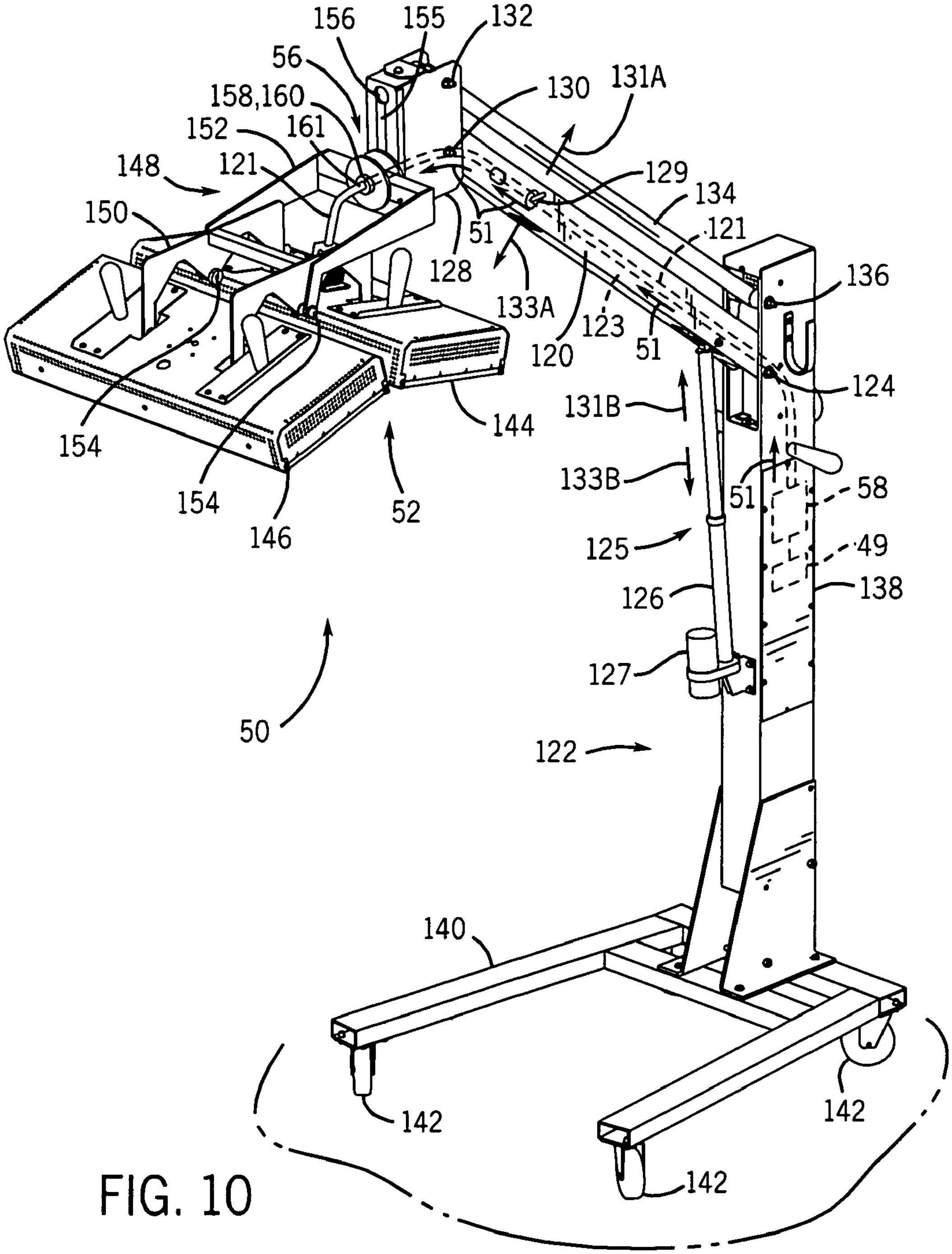
FIG. 10 is a perspective view of an embodiment of an electrically actuated arm assembly, curing device, and adjustable height mechanism of the finish curing system as illustrated in FIG. 2.
Figure 11:
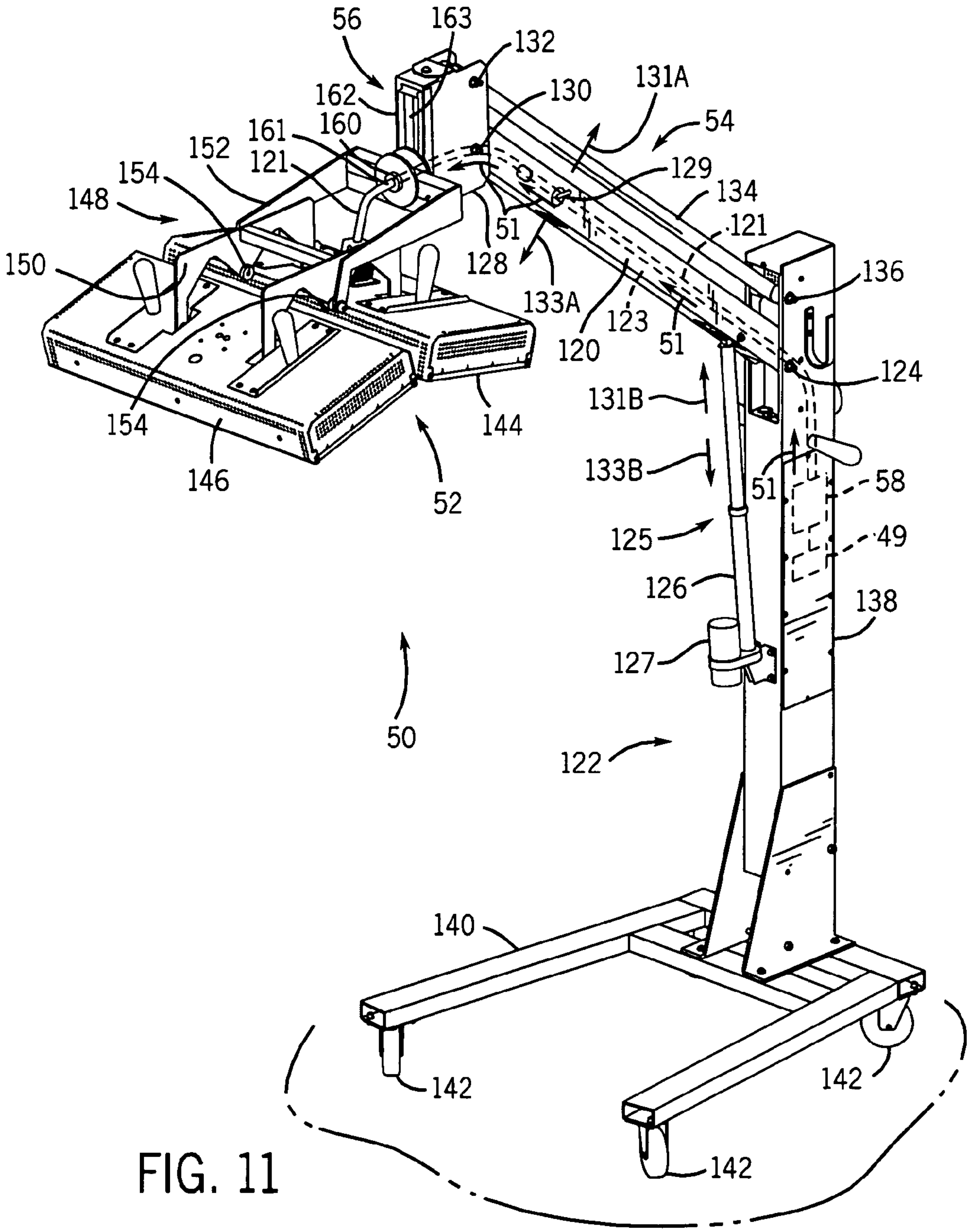
FIG. 11 is a perspective view of an alternative embodiment of the finish curing system as illustrated in FIG. 10.

FIG. 10 is a perspective view of an alternative embodiment of the finish curing system 50 as illustrated in FIGS. 2 and 4, wherein the arm assembly 54 has a motorized drive 125 extending between the arm support 122 and the arm structure 120. Similarly, FIG. 11 is a perspective view of an alternative embodiment of the finish curing system 50 as illustrated in FIGS. 2 and 5, wherein the arm assembly 54 has the motorized drive 125 extending between the arm support 122 and the arm structure 120. Again, similar to the embodiments of FIGS. 4 and 5, the finish curing systems 50 of FIGS. 10 and 11 include one or more electrical/communication cables 121 disposed in one or more passages 123 extending through the adjustable arm assembly 54 between the control system 58 and the curing device 52. The control system 58 is mounted within, on, and/or outside the arm support 122. The illustrated embodiments also include one or more of the fans 49 pneumatically coupled to the internal passage 123, thereby facilitating cooling airflow 51 along the electrical/communication cables 121 toward the curing device 52. Again, the one or more passages 123 and electrical/communication cables 121 extend through various movable joints of the adjustable arm assembly 54, such that the electrical/communication cables 121 are at least substantially or entirely concealed within the assembly 54 between the control system 58 and the curing device 52. For example, the pivot joints 124 and 130 (e.g., adjustable friction pivot joints) and the adjustable height mechanism 56 enable internal passage of both the electrical/communication cables 121 and the cooling airflow 51 generally without extending outside the adjustable arm assembly 54. The control system 58 may then receive power from a single power cable leading to an external power source. The electrical/communication cables 121 also may be disposed within a conduit, paneling, or another enclosure between the fastener 160 and the curing device 52, thereby completely enclosing the cables 121. In addition, the airflow 51 may be directed toward various sensors (e.g., temperature sensor 53), devices (e.g., laser sighting system 55), and components on or adjacent the curing device 52, as illustrated in FIGS. 2 and 6.

In the illustrated embodiments, the motorized drive 125 includes the arm positioning linkage 126, e.g., a linear drive, coupled to an electric motor 127, which is electrically coupled to an electrical actuator or position control switch 129. If the actuator or switch 129 is moved upward as indicated by arrow 131A, then the electric motor 127 is actuated to power the linear drive 126 in the upward direction as indicated by arrow 131B. Similarly, if the actuator or switch 129 is moved downward as indicated by arrow 133A, then the electric motor 127 is actuated to power the linear drive 126 in the downward direction as indicated by arrow 133B. In certain embodiments, the linear drive 126 comprises a worm gearing mechanism, such as a male threaded shaft disposed within a female threaded shaft as discussed in further detail below. In other embodiments, the linear drive 126 includes a hydraulic drive assembly having a hydraulic chamber, a hydraulic pump, and other suitable components. The actuator or switch 129 also can include a variety of control devices, such as separate up and down buttons, an electronic control panel, a wireless remote control unit, a wired remote control unit, or a combination thereof.

Figure 12:
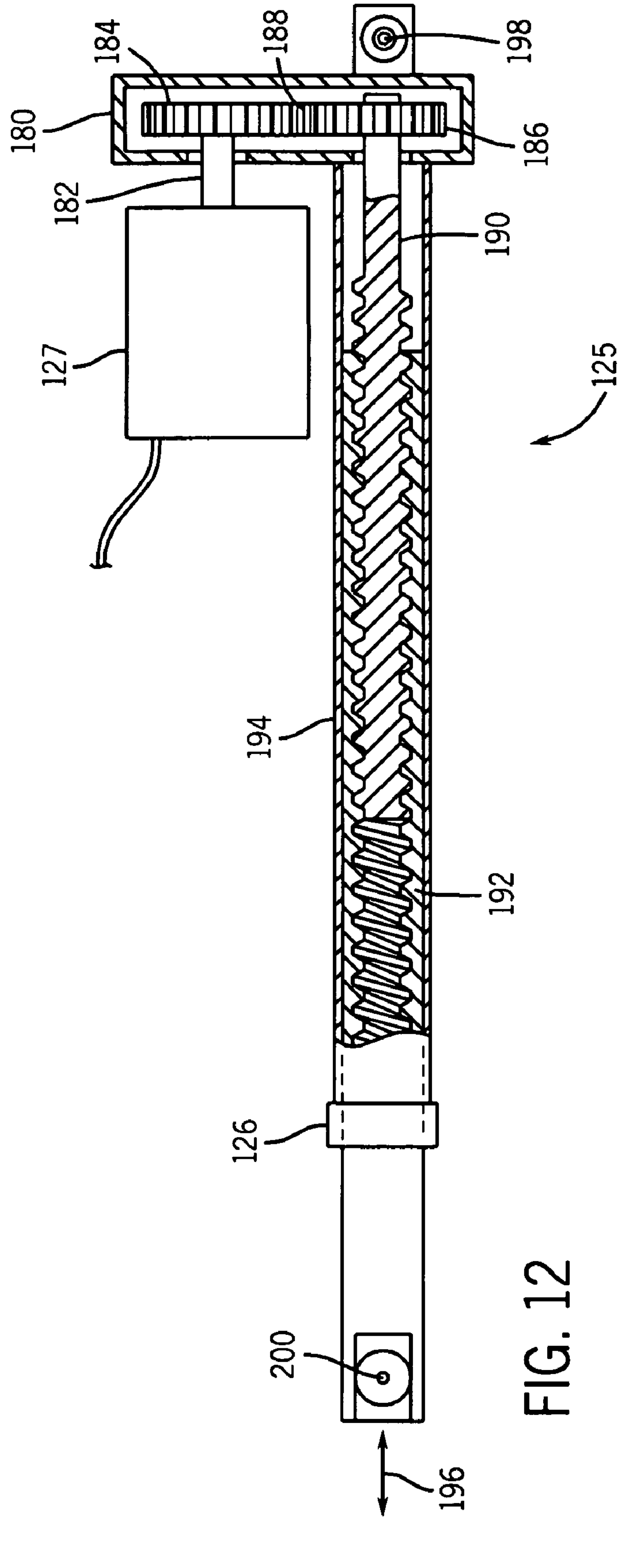
FIG. 12 is a diagram illustrating an embodiment of a motorized drive for the electrically actuated arm assemblies as illustrated in FIGS. 10 and 11.

As discussed above, the motorized drive 125 provides a desired force and range of linear movement to rotate the arm structure 120 relative to the vertical support 138, thereby enabling a user to more easily and quickly reposition the curing device 52 relative to a target object. FIG. 12 is a diagram of the motorized drive 125 in accordance with embodiments of the present technique. In the illustrated embodiment, the motorized drive 125 includes the electric motor 127 coupled to a gear box 180, which is coupled to the linear drive 126. More specifically, the electric motor 127 has a rotating motor shaft 182 coupled to a first gear 184, which engages a second gear 186 at an interface 188 within the gear box 180. In turn, the second gear 186 is coupled to a male worm shaft or externally threaded shaft 190 of the linear drive 126. This externally threaded shaft 190 rotatably engages or threads with internal threads of a moveable drive structure, e.g., a female worm or internally threaded structure 192, disposed slidingly inside a drive enclosure 194. As illustrated, a portion of the female worm 192 remains inside the drive enclosure 194, while a peripheral portion of the female worm 192 moves inwardly and outwardly from an open end of the drive enclosure 194. In addition, alternate embodiments of the motorized drive 125 may have hydraulic or pneumatic systems including pumps, piston and cylinder assemblies, and so forth. Moreover, the motorized drive 125 may include a variety of other power sources and linear positioning systems.

In operation, the electric motor 127 rotates the motor shaft 182 and the first gear 184, which then rotates the second gear 186 and the externally threaded shaft 190. As a result of this rotation, the externally threaded shaft 190 progressively threads the internally threaded structure 192 to provide a linear movement 196 along the length of the drive enclosure 194. Depending on the direction of rotation, the linear movement 196 is either inward or outward, such that the overall linear drive 126 either contracts or expands, respectively. The motorized drive 125 also includes first and second pivot joints 198 and 200, which are configured to connect with the vertical support 188 and the arm structure 120. The connection points for these first and second pivot joints 198 and 200 may vary depending on the desired leverage and range of linear movement 196. For example, the joints 198 and 200 can be connected to the vertical support 188 and the arm structure 120 at a desired offset relative to the pivot joint 124 of the arm structure 120, as illustrated in FIGS. 10 and 11.

Figure 13:
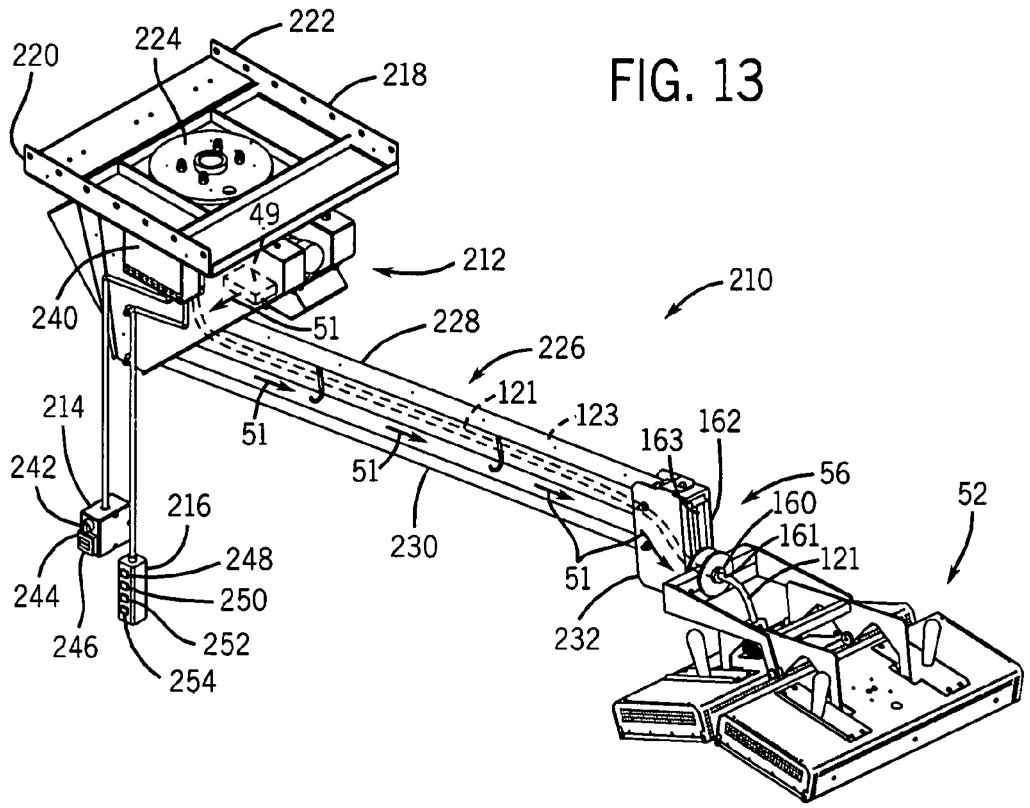
FIG. 13 is a perspective view of another embodiment of an electrically actuated arm assembly of the finish curing system as illustrated in FIG. 2.
Figure 14:
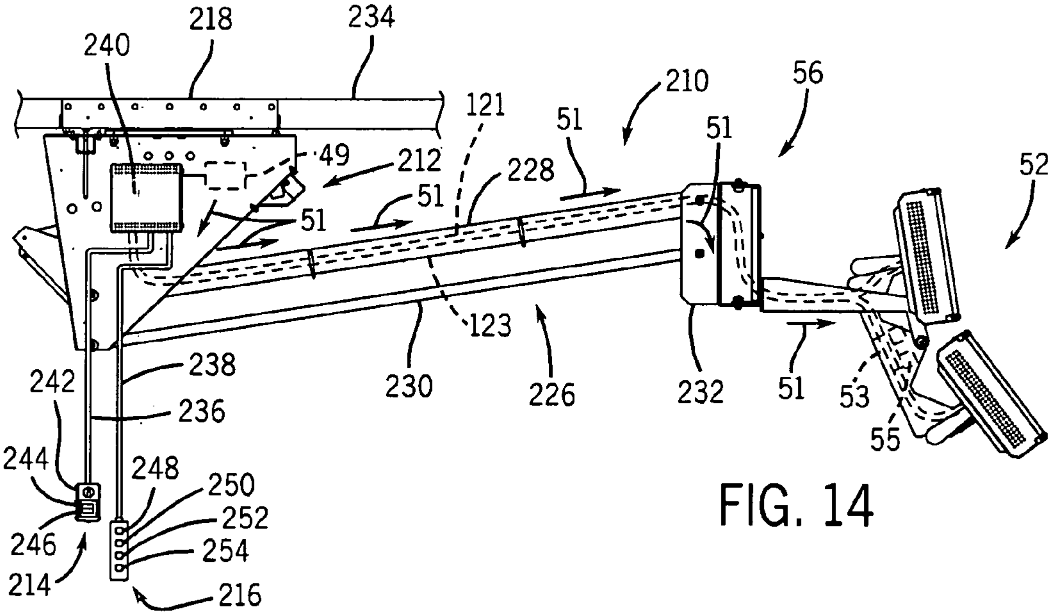
FIG. 14 is a side view of the electrically actuated arm assembly as illustrated in FIG. 13.
Figure 15:
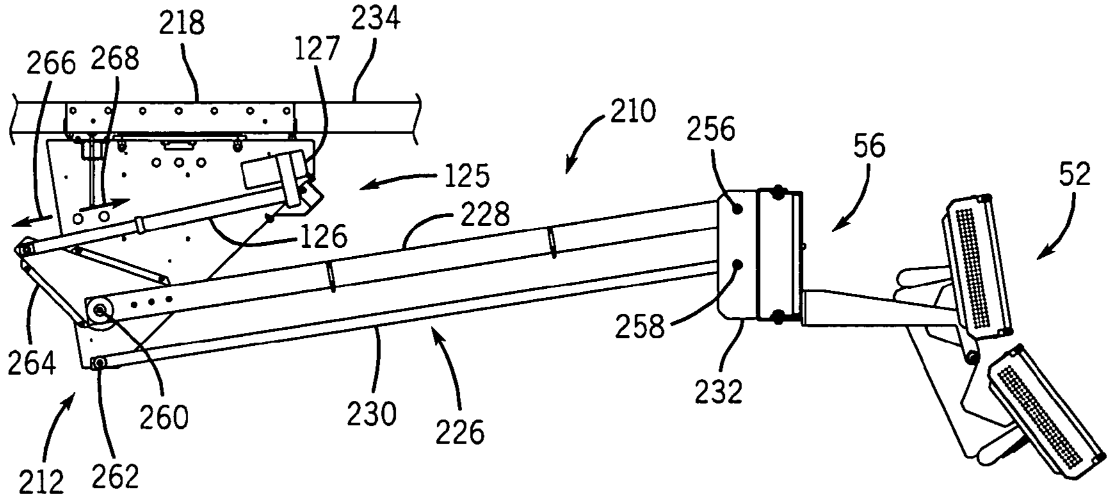
FIG. 15 is a side view of the electrically actuated arm assembly as illustrated in FIG. 14 with a portion removed to illustrate interconnectivity with a motorized drive.

FIGS. 13, 14, and 15 illustrate an overhead arm assembly 210 having a motorized drive section 212 and remote control units 214 and 216 in accordance with embodiments of the present technique. Again, similar to the embodiments described in detail above, the overhead arm assembly 210 of FIGS. 13, 14, and 15 includes one or more electrical/communication cables 121 disposed in one or more passages 123 extending through the overhead arm assembly 210 to the curing device 52. The illustrated embodiment also includes one or more of the fans 49 pneumatically coupled to the internal passage 123, thereby facilitating cooling airflow 51 along the electrical/communication cables 121 toward the curing device 52. Again, the one or more passages 123 and electrical/communication cables 121 extend through various movable joints of the overhead arm assembly 210, such that the electrical/communication cables 121 are at least substantially or entirely concealed within the overhead arm assembly 210. For example, the pivot joints (e.g., adjustable friction pivot joints) and the adjustable height mechanism 56 enable internal passage of both the electrical/communication cables 121 and the cooling airflow 51 generally without extending outside the overhead arm assembly 210. The electrical/communication cables 121 also may be disposed within a conduit, paneling, or another enclosure between the fastener 160 and the curing device 52, thereby completely enclosing the cables 121. In addition, the airflow 51 may be directed toward various sensors (e.g., temperature sensor 53), devices (e.g., laser sighting system 55), and components on or adjacent the curing device 52, as illustrated in FIG. 2.

FIG. 13 is a perspective view of the overhead arm assembly 210 illustrating features of an overhead head mount or rail mounting structure 218. As illustrated, the rail mounting structure 218 includes a pair of flanges or mounting lips 220 and 222 that are configured to mount with an overhead structure, such as a rail, a ceiling, or another structure disposed above the target object. In addition, the overhead mount or rail mounting structure 218 includes a central rotating mechanism 224, which is configured to enable rotation of the overhead arm assembly 210 relative to the flanges or mounting lips 220 and 222. The overhead arm assembly 210 also includes a rotatable arm assembly 226 coupled to the motorized drive section 212. The illustrated arm assembly 226 includes a first arm 228 and a second arm 230, which arms extend outwardly to a head or peripheral portion 232. In turn, the curing device 52 is coupled to the head 232 via an adjustable height mechanism 56, as discussed in detail above. Again, the adjustable height mechanism 56 enables the curing device 52 to be positioned at a variety of vertical positions relative to the head 232. In addition, as discussed in further detail below, the motorized drive section 212 responds to user controls or actuation devices to rotate the arm assembly 226 upward or downward relative to the overhead mount or rail mounting structure 218. For example, the remote control units 214 and 216 include a variety of user controls to operate the motorized drive section 212, the curing device 52, and various other features of the overhead arm assembly 210.

FIG. 14 is a side view of the overhead arm assembly 210 having the overhead mount or the rail mounting structure 218 coupled to an overhead structure or rail mechanism 234 in accordance with embodiments of the present technique. Depending on the particular application, the rail mounting structure 218 may be fixedly or moveably coupled to the rail mechanism 234 at a desired position above the target object having a surface material to be cured by the curing device 52. Accordingly, the remote control units 214 and 216 may include one or more control functions to move the overhead arm assembly 210 along the rail mechanism 234 via hydraulics, pneumatics, a cable and pulley system, or a variety of motorized mechanisms.

In the illustrated embodiment, the remote control units 214 and 216 include wires 236 and 238 leading to a wiring or electronics control box 240 disposed on the motorized drive section 212. As illustrated, the remote control unit 214 includes a knob 242 and buttons 244 and 246, which are configured to control the temperature profile of the curing device 52. In addition, the illustrated remote control unit 216 includes buttons 248, 250, 252, and 254, which may include a cycle start button, a laser start button, an upward movement button, and a downward movement button. For example, the cycle start button may be configured to initiate a curing cycle for curing a coating or surface material disposed on the target object positioned below the overhead arm assembly 210. Moreover, the laser start button may be configured to initiate a sighting laser to facilitate precise positioning of the curing device 52 relative to the surface of the target object. Finally, the upward and downward movement buttons are configured to actuate the motorized drive section 212 to drive or rotate the rotatable arm assembly 226 in an upward or downward direction relative to the overhead mount or rail mounting structure 218.

FIG. 15 is a side view of the overhead arm assembly 210 with a portion of the motorized drive section 212 removed to illustrate the motorized drive 125 coupled to the rotatable arm assembly 226 in accordance with embodiments of the present technique. As illustrated, the first and second arms 228 and 230 are rotatably coupled to the head 232 via pivot joints 256 and 258, respectively. In addition, opposite ends of the first and second arms 228 and 230 are rotatably coupled to the motorized drive section 212 via pivot joints 260 and 262, respectively. In turn, the first arm 228 is coupled to the linear drive 126 of the motorized drive 125 via an intermediate link or leveraging member 264. If the user engages an upward button on the remote control unit 216 (see FIGS. 13 and 14), then the electric motor 127 drives the linear drive 126 in an outward or expansive direction 266, thereby causing the first arm 228 to rotate in a counterclockwise direction effectuating an upward movement of the overhead arm assembly 210 and associated curing device 252. If the user engages a downward button on the remote control unit 216, then the electric motor 127 moves the linear drive 126 in an inward or contracting direction 268, thereby rotating the overhead arm assembly 210 in a clockwise direction to move the curing device 52 in a downward direction. Again, as discussed in detail above, the motorized drive 125 may include a variety of gearing mechanisms, hydraulics, pneumatics, cable and pulley systems, and other suitable power and positioning mechanisms in accordance with embodiments of the present technique.

Figure 16:
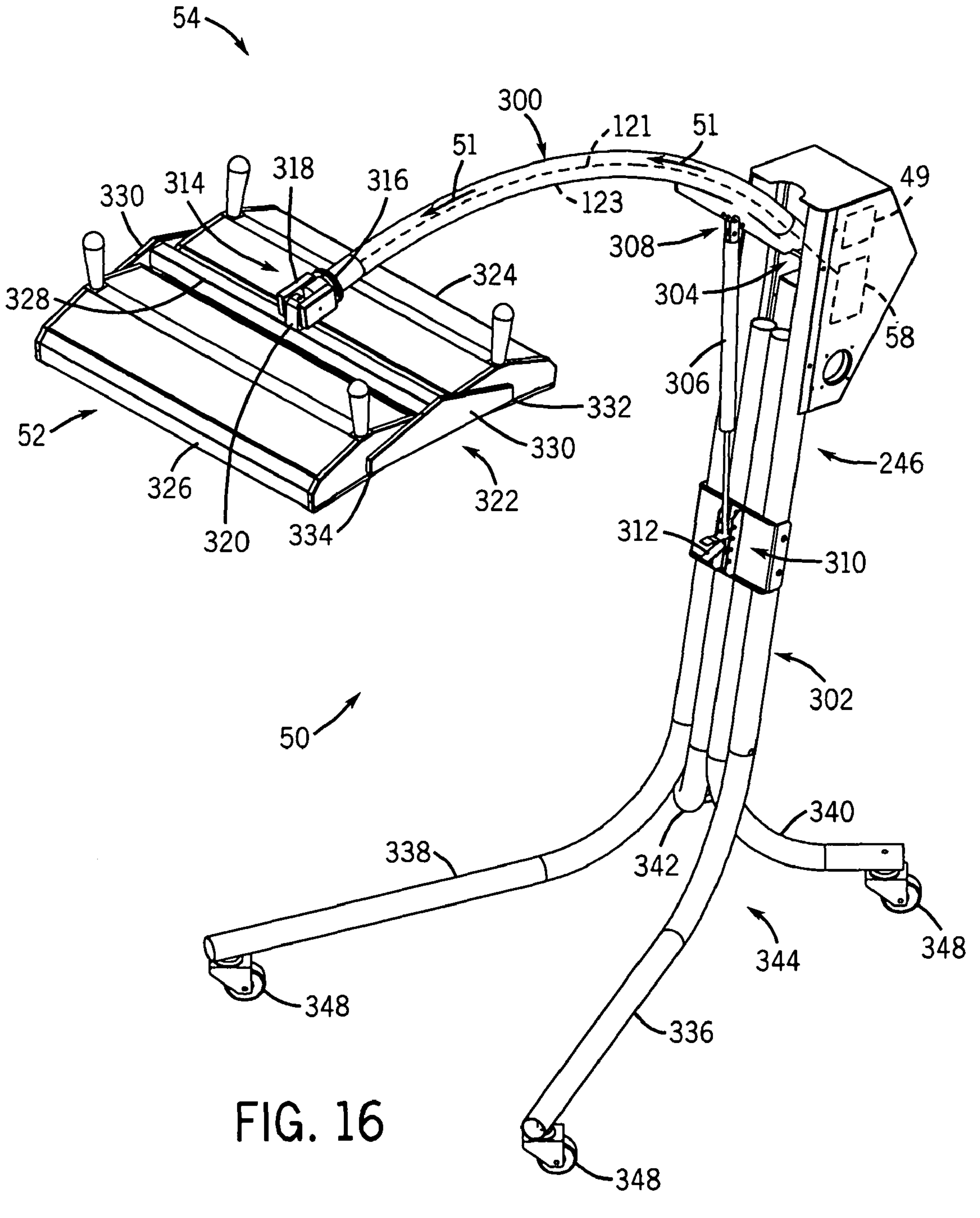
FIG. 16 is a perspective view of another embodiment of an adjustable arm assembly and curing device of the finish curing system as illustrated in FIG. 2.

FIG. 16 is a perspective view of another embodiment of the finish curing system 50 as illustrated in FIG. 2, wherein one or more electrical/communication cables 121 are disposed in one or more passages 123 extending through the adjustable arm assembly 54 between the control system 58 and the curing device 52. The illustrated embodiment also includes one or more of the fans 49 pneumatically coupled to the internal passage 123, thereby facilitating cooling airflow 51 along the electrical/communication cables 121 toward the curing device 52. Again, the one or more passages 123 and electrical/communication cables 121 extend through various movable joints of the adjustable arm assembly 54, such that the electrical/communication cables 121 are at least substantially or entirely concealed within the assembly 54 between the control system 58 and the curing device 52.

As illustrated in FIG. 16, the adjustable arm assembly 54 comprises an arm structure 300 rotatably coupled to an arm support 302 via a pivot joint 304 (e.g., an adjustable friction pivot joint). The illustrated arm structure 300 has an arcuate or curved shape, which is generally curved in an upward direction between the arm support 302 and the curing device 52. As discussed in further detail below, the upwardly curved or arcuate shape of the arm structure 300 provides additional clearance between the adjustable arm assembly 54 and the target object 14. In addition, the illustrated arm structure 300 is a single rotatable arm rather than multiple parallel arms as illustrated in the embodiments of FIGS. 4-11 and 13-15. The single rotatable arm may simplify the routing of the electrical/communication cables 121 and the cooling airflow 51 through the adjustable arm assembly 54, thereby facilitating complete enclosure of the cables 121 within the confines of the adjustable arm assembly 54.

The adjustable arm assembly 54 may have several degrees of freedom attributed to various joints and motion-inducing (e.g., rotation-inducing) mechanisms. As a result, the arm structure 300 can raise, lower, shift, rotate, and generally move the curing device 52 in different directions and axes of rotation to a desired position. The illustrated adjustable arm assembly 54 has an arm positioning linkage 306 extending between the arm support 302 and the arm structure 300, such that the arm structure 300 may rotate in a range extending between minimum and maximum vertical positions. As illustrated, the arm positioning linkage 306 includes opposite pivot joints 308 and 310 coupled to the arm structure 300 and the arm support 302 respectively, wherein the opposite pivot joints 308 and 310 are both offset from the pivot joint 304. The arm positioning linkage 306 also may include an actuator or adjustment mechanism 312. In certain embodiments, the arm positioning linkage 306 may include a variety of manual or automatic motion-inducing mechanisms, such as a hydraulic mechanism, a pneumatic mechanism, a geared mechanism, a motorized mechanism, a cable and pulley mechanism, or any other suitable mechanism. For example, the arm positioning linkage 306 may includes a gas-filled piston-cylinder assembly or a motorized linear drive mechanism.

In addition, the adjustable arm assembly 54 has an adjustable end structure 314 coupled to the arm structure 300. For example, the adjustable end structure 314 may include a plurality of adjustable friction rotational joints 316, 318, and 320. The adjustable friction rotational joint 316 may enable rotation about a lengthwise axis of the arm structure 300. The adjustable friction rotational joint 318 may enable rotation about a crosswise axis relative to the arm structure 300. Similarly, the adjustable friction rotational joint 320 may enable rotation about another crosswise axis relative to the arm structure 300 and the adjustable friction rotational joint 318. In other words, the rotational joints 316, 318, and 320 provide three different axis of rotation, e.g., X, Y, and Z axes of rotation, to enable three-dimensional movement of the curing device 52 relative to the arm structure 300. The friction of these joints 316, 318, and 320 may be adjusted via a threaded fastener or another suitable adjustment mechanism. Again, the adjustable end structure 314 enables the electrical/communication cables 121 and the cooling airflow 51 to pass through the joints 316, 318, and 320.

The adjustable end structure 314 is coupled to a head structure 322, which supports the curing device 52. In the illustrated embodiment, the head structure 322 has a generally H-shaped geometry and the curing device 52 includes a pair of heating/drying devices 324 and 326 (e.g., infrared lamps). The head structure 322 includes a central member 328 disposed between opposite lamp supports 330. The pair of heating/drying devices 324 and 326 are rotatably coupled to the head structure 322 via adjustable friction pivot joints 332 and 334 disposed on the opposite lamp supports 330. As a result, the pair of heating/drying devices 324 and 326 can rotate about independent crosswise axes relative to the head structure 322, while the joints 316, 318, and 320 provide three more independent rotational axes for movement between the head structure 322 and the arm structure 300. In certain embodiments, one or more of these joints 316, 318, 320, 332, and 334 may have an automatic or assisted positioning system, which may include a motorized drive, hydraulics, pneumatics, and so forth. Again, the head structure 322 may enable passage of the electrical/communication cables 121 and the cooling airflow 51 toward the pair of heating/drying devices 324 and 326 and various components (e.g., temperature sensor 53 and laser sighting system 55).

The illustrated arm support 302 includes a set of four legs 336, 338, 340, and 342, which include horizontal and vertical portions. For example, each of the illustrated legs 336, 338, 340, and 342 has a generally L-shaped geometry, which generally curves upwardly from the horizontal portion to the vertical portion. Together, the horizontal portions of the legs 336, 338, 340, and 342 may form a horizontal base structure 344, while the vertical portions may form a vertical support structure 346. A plurality of wheels 348 also may be coupled to the legs 336, 338, 340, and 342. However, the arm support 302 may comprise any suitable fixed or movable structure depending on the particular application. For example, the arm support 302 may be bolted or generally secured to a wall, a floor, a vehicle, a trailer, or any other suitable vertical, horizontal, or angled mounting structure. The arm support 302 also may have a manual or automatic positioning system, such as a rotational or linear positioning system to move the arm support 302 adjacent the target object 14. For example, the arm support 302 may be coupled to a rail structure along a floor, wall, or ceiling. In addition, the rail structure may include a powered drive mechanism to push or pull the arm support 302. By further example, the arm structure may be expandable and contractible in a vertical direction, such that the height of the arm support 302 can be varied to accommodate a particular curing application. Again, a powered drive mechanism can be included to facilitate this vertical expansion and contraction of the arm support 302. Accordingly, the adjustable arm assembly 54 can position the curing device 52 in a desired curing position relative to the target object 14.

As discussed above, the cables 121 extend through the passages 123 directly through the arm structure 300 without creating a mess of cables outside of the arm structure 300. In addition, a fluid coolant (e.g., air, water, or a suitable gas or liquid) can pass in a direction to and/or from the curing device 52. In certain embodiments, the passages 123 include airflow passages, liquid coolant passages, or a combination thereof. For example, the passages 123 may include concentric or coaxial passages, e.g., air and liquid passages, or supply and return passages, or a combination thereof. By further example, the passages 123 may include parallel or side-by-side passages, e.g., air and liquid passages, or supply and return passages, or a combination thereof. Moreover, the cables 121 may be disposed coaxially within the air or liquid passages to facilitate cooling of the cables 121. In one specific embodiment, the passages 123 include a liquid supply passage from the arm support 302 to the head structure 322, a liquid return passage from the head structure 322 to the arm support 302, a pump coupled to the liquid supply and/or return passage, a radiator coupled to the liquid return passage, and a fan configured to blow air through the radiator. In addition, the liquid passages extend along various portions of the head structure 322 adjacent the curing device 52.

Figure 17:
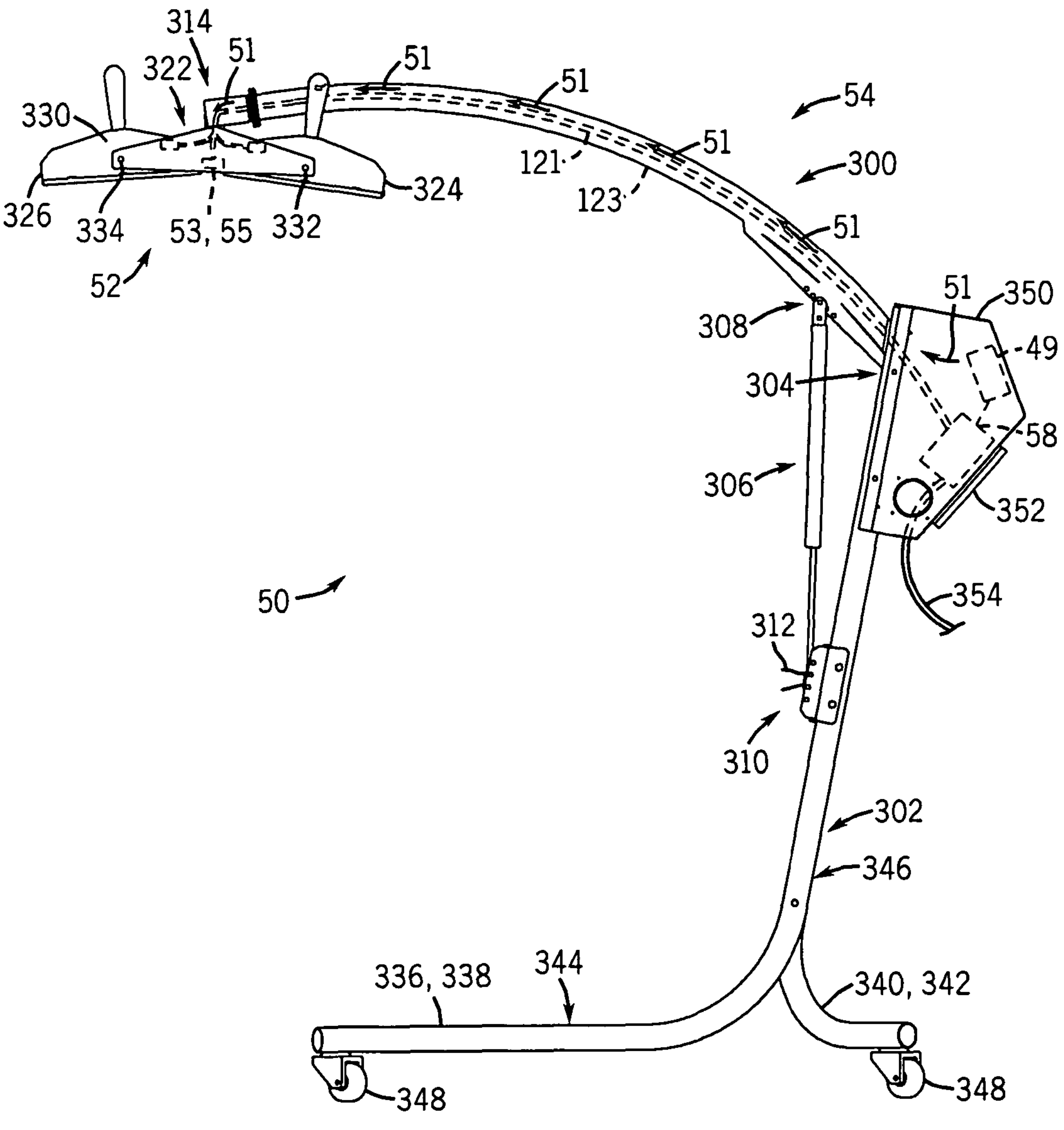
FIG. 17 is a side view of the finish curing system as illustrated in FIG. 16.

FIG. 17 is a side view of the finish curing system as illustrated in FIG. 16, further illustrating the electrical/communication cables 121 and cooling airflow 51 passing through the adjustable arm assembly 54 between the control system 58 and the curing device 52. Specifically, the electrical/communication cables 121 and cooling airflow 51 passes through the pivot joint 308, through the arm structure 300, through the rotational joints 316, 318, and 320 of the adjustable end structure 314, through the head structure 322 (e.g., central member 328), and to the heating/drying devices 324 and 326 (e.g., infrared lamps) and associated devices (e.g., temperature sensor 53 and laser sighting system 55). As a result, the electrical/communication cables 121 are housed or contained entirely within the confines of the adjustable arm assembly 54 without extending outside at the various rotational joints and structures. Moreover, the cooling airflow 51 is generally continuous or uninterrupted from the fan 49 near the control system 58 to the heating/drying devices 324 and 326 (e.g., infrared lamps) and associated devices (e.g., temperature sensor 53 and laser sighting system 55).

In the illustrated embodiment, the control system 58 and the fan 49 are disposed in a control box 350, which may be substantially sealed with the arm structure 300. For example, the pivot joint 304 between the control box 350 and the arm structure 300 may include a variety of seals, such as o-rings, surrounding foam material, gaskets, resilient annular seals, and so forth. As a result, the fan 49 can create a greater cooling airflow 51 through the arm structure 300 to the curing device 52. Similarly, the adjustable end structure 314 may include a variety of seals, for example, in the joints 316, 318, and 320. Again, the seals may result in a greater amount of the cooling airflow 51 passing to the curing device 52 and various components. In addition, the control system 58 may be coupled to a user interface or control panel 352 and an input power cable 354. Thus, the input power cable 354 may be the only electrical cable outside of the adjustable arm assembly 54.

Figure 18:
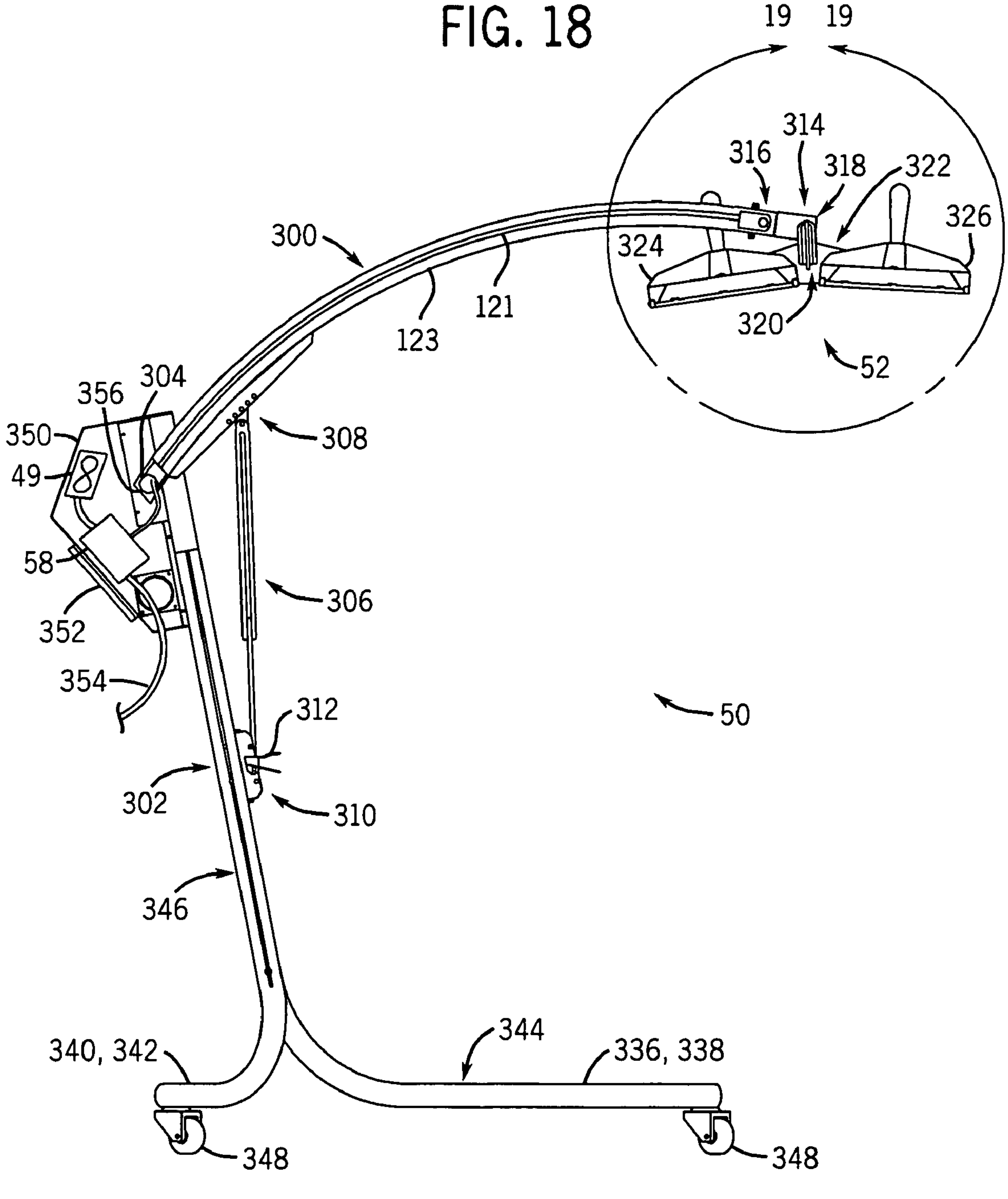
FIG. 18 is a cross-sectional side view of the finish curing system as illustrated in FIG. 17.

FIG. 18 is a cross-sectional side view of the finish curing system 50 as illustrated in FIG. 17. As illustrated, the pivot joint 304 includes a lateral opening or passage 356 along the axis of rotation of the pivot joint 304. As a result, the electrical/communication cables 121 can pass through the pivot joint 304 along the axis of rotation through the passage 356, and also through a passage aligned lengthwise with the arm structure 300 and the passage 123. As discussed in further detail below, the rotational joints 316, 318, and 320 in the adjustable end structure 314 may have similar passages for the electrical/communication cables 121 and the cooling airflow 51. For clarity of these joints 316, 318, and 320, the electrical/communication cables 121 are shown only partially through the arm structure 300 without extending through the adjustable end structure 314.

Figure 19:
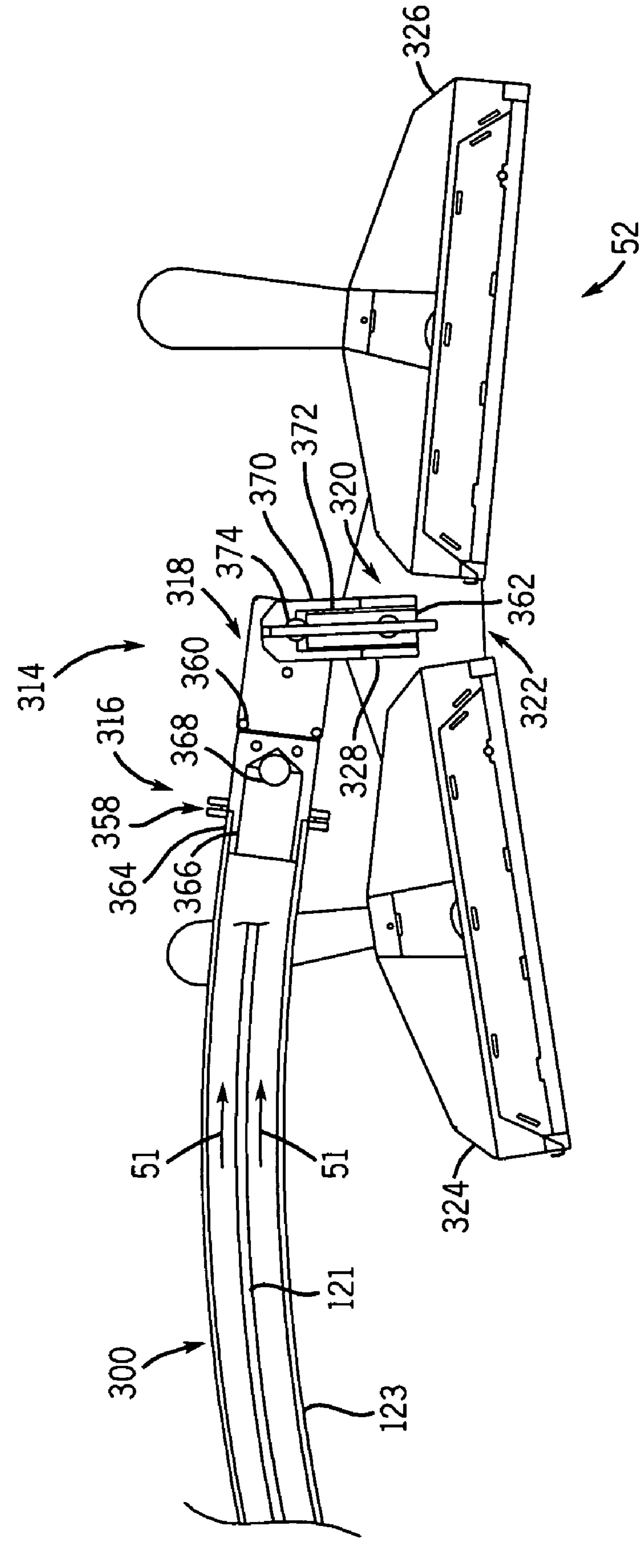
FIG. 19 is a partial cross-sectional side view of the finish curing system as illustrated in FIGS. 17 and 18.

FIG. 19 is a partial cross-sectional side view of the finish curing system 50 as illustrated in FIGS. 17 and 18, further illustrating details of the rotational joints 316, 318, and 320 in the adjustable end structure 314. As illustrated, the rotational joint 316 includes an adjustable friction pad 358, such as an annular or disc-shaped friction pad, disposed between the arm structure 300 and the rotational joint 318. The rotational joints 318 and 320 also include adjustable friction pads 360 and 362. These friction pads 358, 360, and 362 can be compressed tighter to increase friction and reduce rotatability of the rotational joints 316, 318, and 320. For example, one or more threaded fasteners can be tightened or loosened to adjust the friction on the pads 358, 360, and 362. As discussed in further detail below, these rotational joints 316, 318, and 320 may include various passages that are crosswise relative to one another. For example, the rotational joint 316 may include a rotary joint member 366 having a lengthwise passage 368 and a crosswise passage 370, wherein the lengthwise passage 368 is generally aligned with the axis of rotation of the rotational joint 316. By further example, the rotational joint 318 may include a pivot trunion 370 having a lengthwise passage 372 and a crosswise passage 374. In turn, the lengthwise passage 372 of the pivot trunion 370 may couple with the central member 328 of the head structure 322. The central member 328 may rotatably engage the pivot trunion 370 via the friction pad 362, thereby forming the rotational joint 320. Again, the electrical/communication cables 321 and the cooling airflow 51 can pass through these rotational joints 316, 318, and 320 without extending outside of the assembly.

Figure 20:
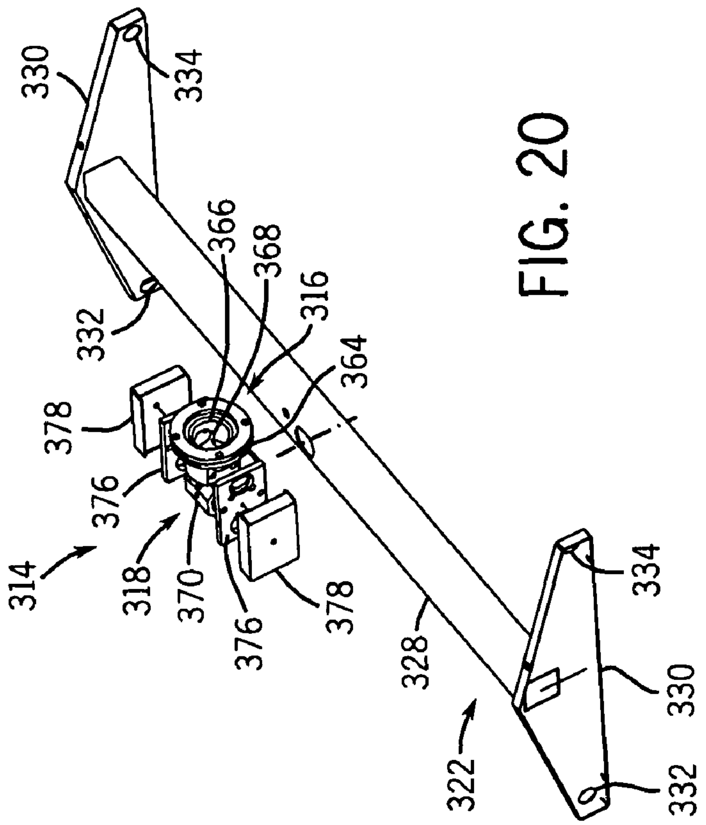
FIGS. 20 and 21 are partial exploded perspective views of a the finish curing system as illustrated in FIG. 19.
Figure 21:
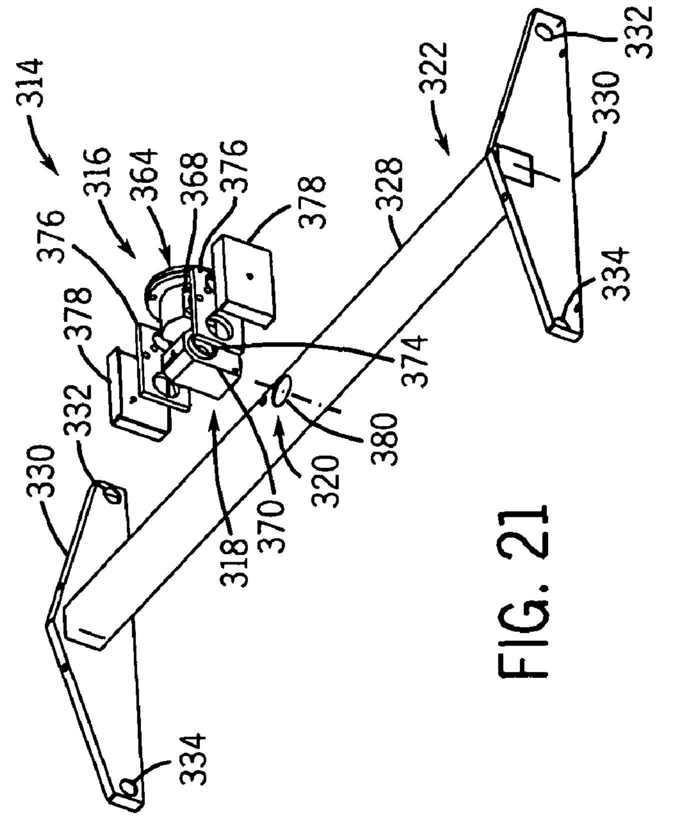

FIGS. 20 and 21 are partial exploded perspective views of the finish curing system 50 as illustrated in FIG. 19, further illustrating an embodiment of the adjustable end structure 314 and the head structure 322. In the illustrated embodiment, the rotary joint member 364 of the rotational joint 316 enables the electrical/communication cables 121 and cooling airflow 51 to enter through the lengthwise passage 366 and exit through the crosswise passages 368. In turn, the electrical/communication cables 121 and cooling airflow 51 pass through opposite clamp plates 376 underneath opposite covers 378. As illustrated, the clamp plates 376 and the cover 378 may be coupled to opposite sides of both the rotary joint member 366 and the pivot trunion 370. In turn, the electrical/communication cables 121 and cooling airflow 51 pass back through the opposite clamp plates 376, into the crosswise passages 374 of the pivot trunion 370, and along the lengthwise passage 372 toward the head structure 322. Upon reaching the central member 328 of the head structure 322, the electrical/communication cables 121 and cooling airflow 51 enter an opening 380 into a hollow interior of the central member 328. The engagement between the opening 380 and the pivot trunion 370 creates the rotational joint 320. The central member 328 then routes the electrical/communication cables 121 and cooling airflow 51 to the desired component. For example, the electrical/communication cables 121 may be routed to the heating/drying devices 324 and 326 (e.g., infrared lamps), the temperature sensor 53 (e.g., optical pyrometer), and the laser sighting system 55.

Figure 23:
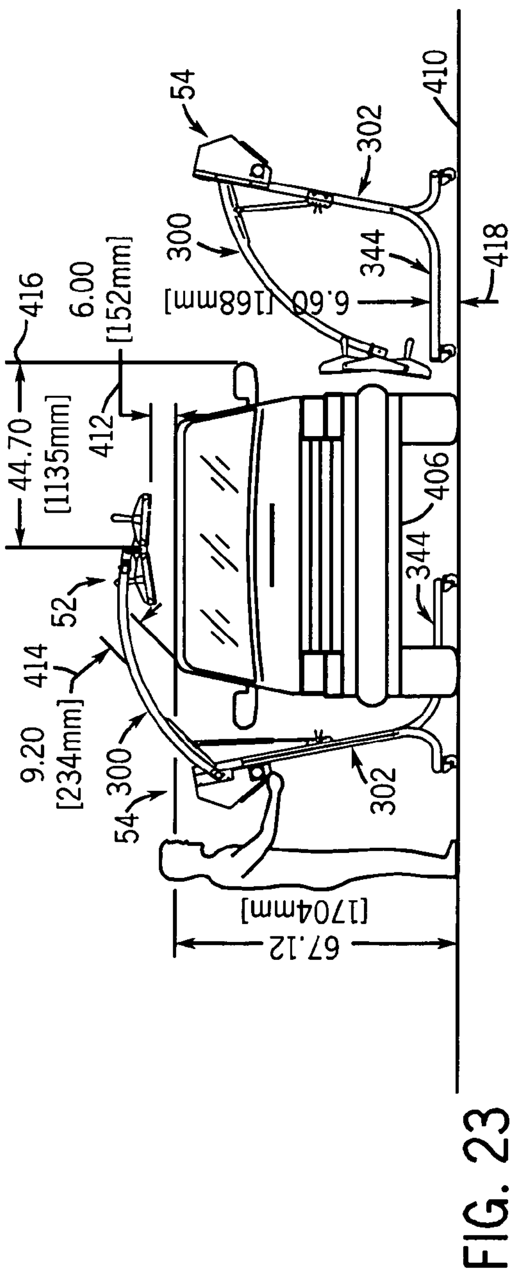
FIGS. 22 and 23 are diagrams illustrating clearance differences between the adjustable arm assemblies of FIGS. 4-11 and the adjustable arm assemblies of FIGS. 16-21.
Figure 22:
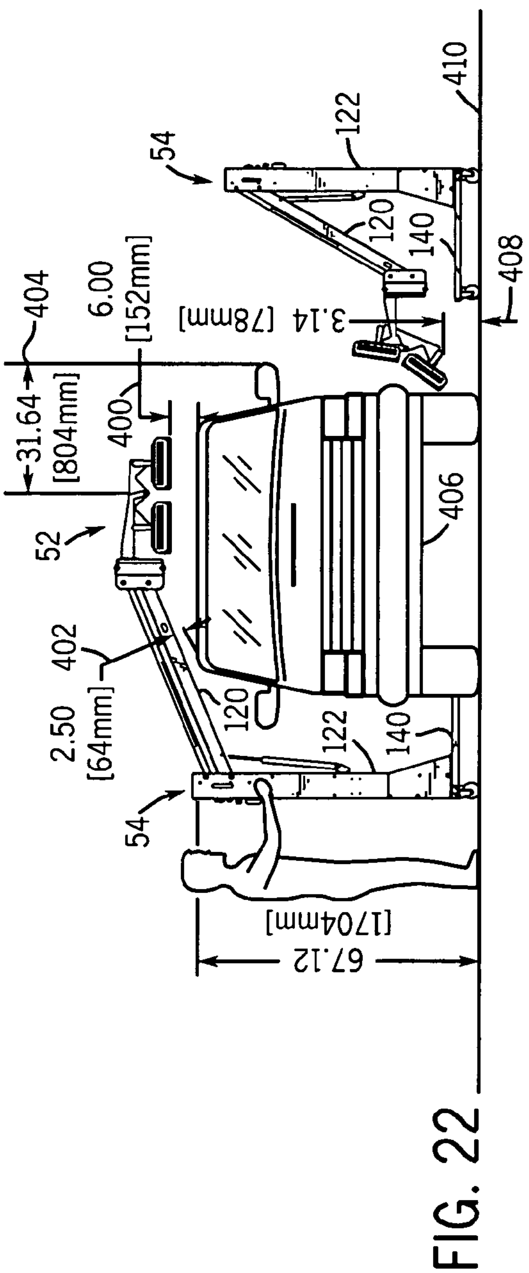

FIGS. 22 and 23 are diagrams illustrating clearance differences between the adjustable arm assemblies of FIGS. 4-11 and the adjustable arm assemblies of FIGS. 16-21. As illustrated in FIG. 22, the adjustable arm assembly 54 of FIGS. 4-11 has clearances 400, 402, and 404 in an overhead position of the arm structure 120 and the curing device 52 relative to a vehicle 406. For example, in one embodiment, the clearances 400, 402, and 404 may be 152, 64, and 804 millimeters, respectively. In addition, the adjustable arm assembly 54 of FIGS. 4-11 has a clearance 408 in a low position of the arm structure 120 and the curing device 52 relative to the ground 410. For example, in one embodiment, the clearance 408 may be 78 millimeters. In contrast, as illustrated in FIG. 23, the adjustable arm assembly 54 of FIGS. 16-21 has clearances 412, 414, and 416 in an overhead position of the arm structure 300 and the curing device 52 relative to the vehicle 406. For example, in one embodiment, the clearances 412, 414, and 416 may be 152, 234, and 1135 millimeters, respectively. In addition, the adjustable arm assembly 54 of FIGS. 16-21 has a clearance 418 in a low position of the arm structure 300 and the curing device 52 relative to the ground 410. For example, in one embodiment, the clearance 418 may be 168 millimeters. As illustrated in FIGS. 22 and 23, the arcuate shape of the arm structure 300 of FIGS. 16-21 provides a greater clearance 414 (e.g., 234 millimeters) relative to the clearance 402 (e.g., 64 millimeters) for the corresponding arm structure 120 of FIGS. 4-11.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:

a rotatable arm comprising a movable joint;

an infrared lamp coupled to the rotatable arm;

an electrical cable extending internally through the rotatable arm and the movable joint to the infrared lamp;

an air cooling passage extending internally through the rotatable arm and the movable joint to the infrared lamp; and a fan coupled to the air cooling passage.

2. The system of claim 1, wherein the rotatable arm comprises an arcuate shaped arm having the electrical cable extending through the air cooling passage.

3. The system of claim 1, wherein the movable joint comprises an adjustable friction joint.

4. The system of claim 1, wherein movable joint is disposed between the rotatable arm and the infrared lamp.

5. The system of claim 4, wherein the movable joint comprises a rotatable joint and a linear sliding joint.

6. The system of claim 1, comprising a drive extending between the rotatable arm and a base portion, wherein the movable joint comprises a first rotational joint disposed between the rotatable arm and a base portion, the drive is coupled to the rotatable arm at a second rotatable joint at a first offset from the first rotatable joint, and the drive is coupled to the base portion at a third rotatable joint at a second offset from the first rotatable joint.

7. The system of claim 6, comprising a head coupled to the rotatable arm, wherein the infrared lamp is coupled to the head, and an optical pyrometer is coupled to the head.

8. The system of claim 6, comprising a control box coupled to the base portion adjacent the rotatable arm, wherein the control box comprises the fan and a control system.

9. The system of claim 1, comprising a temperature sensor configured to sense a temperature of a surface being heated by the infrared lamp, wherein the fan is configured to provide an air flow through the air cooling passage to cool the temperature sensor.

10. The system of claim 9, wherein the temperature sensor comprises a pyrometer.

11. The system of claim 9, comprising a laser sight and a closed loop controller, wherein the closed loop controller is coupled to the temperature sensor and the infrared lamp, the closed loop controller is configured to control the infrared lamp in response to the temperature sensed by the temperature sensor, the laser sight is configured to facilitate targeting of the infrared lamp and the temperature sensor toward the surface, and the fan is configured to provide the air flow through the air cooling passage to cool the laser sight and the temperature sensor.

12. A system, comprising:

a base;

an arm coupled to the base via a first rotatable joint, wherein the arm comprises an arcuate shape;

a head coupled to the arm via a second rotatable joint;

an infrared lamp coupled to the head, wherein the infrared lamp is configured to heat a surface;

a temperature sensor configured to sense a temperature of the surface;

an air flow passage extending internally through the first rotatable joint, the arm, and the second rotatable joint;

a fan pneumatically coupled to the air flow passage, wherein the fan is configured to provide an air flow through the air flow passage to cool the temperature sensor; and at least one electrical cable extending internally through the air flow passage to the infrared lamp and the temperature sensor.

13. The system of claim 12, comprising a closed loop controller coupled to the at least one electrical cable, wherein the closed loop controller is configured to control the infrared lamp in response to the temperature sensed by the temperature sensor.

14. The system of claim 12, comprising a laser sight configured to facilitate targeting of the infrared lamp and the temperature sensor toward the surface, wherein the fan is configured to provide the air flow through the air flow passage to cool the laser sight.

15. The system of claim 14, wherein the temperature sensor and the laser sight are coupled to the head.

16. The system of claim 12, comprising a drive mechanism having a first pivot joint coupled to the base and a second pivot joint coupled to the arm, wherein the first and second pivot joints are offset from the first rotatable joint.

17. The system of claim 12, comprising a height adjustment mechanism disposed between the arm and the head, wherein the air flow passage extends through the height adjustment mechanism.

18. The system of claim 17, wherein the height adjustment mechanism consists essentially of a vertical path.

19. The system of claim 12, wherein the temperature sensor comprises a thermal radiation sensor.

20. The system of claim 19, wherein the thermal radiation sensor comprises an optical pyrometer.

21. A system, comprising:

a rotatable arm comprising a movable joint;

an infrared lamp coupled to the rotatable arm, wherein the infrared lamp is configured to heat a surface;

a thermal radiation sensor configured to sense a temperature of the surface; and a coolant passage extending internally through the rotatable arm and movable joint, wherein the coolant passage is configured to flow a coolant to cool the thermal radiation sensor.

22. The system of claim 21, comprising an electrical cable extending internally through the rotatable arm and the movable joint.

23. The system of claim 21, wherein the coolant passage comprises an air passage coupled to a fan.

24. The system of claim 21, wherein the coolant passage comprises a liquid coolant supply passage and a liquid coolant return passage.

25. The system of claim 21, wherein the movable joint comprises a rotatable joint.

26. The system of claim 25, wherein the coolant passage comprises a joint passage extending along an axis of rotation through the rotatable joint.

27. The system of claim 21, wherein the movable joint comprises a first movable joint between the rotatable arm and a base portion and a second movable joint between the rotatable arm and the infrared lamp, wherein the coolant passage extends internally through the first and second movable joints.

28. The system of claim 21, wherein the thermal radiation sensor comprises an optical pyrometer.

* * * * *